(12) United States Patent
Vollath

(10) Patent No.: US 8,542,146 B2
(45) Date of Patent: Sep. 24, 2013

(54) GENERALIZED PARTIAL FIXING

(75) Inventor: Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 10 days.

(21) Appl. No.: 12/734,298

(22) PCT Filed: Oct. 23, 2008

(86) PCT No.: PCT/US2008/012045
§ 371 (c)(1),
(2), (4) Date: Apr. 23, 2010

(87) PCT Pub. No.: WO2009/058213
PCT Pub. Date: May 7, 2009

(65) Prior Publication Data
US 2010/0253575 A1    Oct. 7, 2010

Related U.S. Application Data

(60) Provisional application No. 61/001,034, filed on Oct. 30, 2007.

(51) Int. Cl.
*G01S 19/44*    (2010.01)
*G01S 19/55*    (2010.01)

(52) U.S. Cl.
USPC .............................. 342/357.27; 342/357.38

(58) Field of Classification Search
USPC ............... 342/357.27, 357.38, 357.4, 357.46; 701/468, 477
See application file for complete search history.

(56) References Cited

U.S. PATENT DOCUMENTS

| | | |
|---|---|---|
| 5,572,218 A | 11/1996 | Cohen et al. |
| 5,610,614 A | 3/1997 | Talbot et al. |
| 5,825,326 A | 10/1998 | Semler et al. |
| 5,914,685 A | 6/1999 | Kozlov et al. |
| 5,991,691 A | 11/1999 | Johnson |
| 6,229,479 B1 | 5/2001 | Kozlov et al. |

(Continued)

OTHER PUBLICATIONS

P. Teunissen et al., "GNSS phase ambiguity validation: A review," 107 IEICE Tech. Rep., vol. 107, No. 2, SANE2007-1, pp. 1-6, Apr. 2007.

(Continued)

*Primary Examiner* — Dao Phan
(74) *Attorney, Agent, or Firm* — Bruce D Riter

(57) ABSTRACT

Described is a generalized approach for integer parameter estimation, especially in the context of Global Navigation Satellite Systems (GNSS). The problem solved is the case where a definitively correct integer solution cannot be identified for all ambiguity parameters in a reliable way. The proposed solution is to apply a linear transformation to the ambiguities (multiply with a matrix) such that the images of the first and the second candidate (or more) are identical. That way, from the first and second (and possibly more) candidates of the integer least-squares solution, a subset of ambiguity combinations is derived that can be fixed. Thus, it is no longer necessary to choose between the solutions as they coincide for the new ambiguities. The advantage of this approach is maximizing all information still available when finally deriving additional parameters such as position, clock error, atmospheric errors and/or time correlated noise. This technique is applicable to real-time and post-processing applications, as well as to pure GNSS applications, GNSS integrated with other sensors (e.g. INS) and other applications that have to resolve multiple integer ambiguities. This may also apply to optical distance-measurement. GNSS applications include kinematic and static positioning with single base stations as well as with multiple base stations or reference station networks. They also comprise the integer parameter estimation methods used within the reference station network computations.

21 Claims, 13 Drawing Sheets

(56) References Cited

U.S. PATENT DOCUMENTS

| | | |
|---|---|---|
| 6,441,780 B1 | 8/2002 | Rog et al. |
| 6,731,701 B2 | 5/2004 | Vorobiev et al. |
| 6,753,810 B1 | 6/2004 | Yang et al. |
| 6,934,632 B2 | 8/2005 | Hatch |
| 7,102,563 B2 | 9/2006 | Rapoport et al. |
| 7,312,747 B2 | 12/2007 | Vollath et al. |
| 7,432,853 B2 | 10/2008 | Vollath |
| 7,538,721 B2 | 5/2009 | Vollath et al. |
| 7,589,668 B2 | 9/2009 | Vollath et al. |

OTHER PUBLICATIONS

P. de Jonge et al., "The LAMBDA method for integer ambiguity estimation: implementation aspects," LGR-Series No. 12, Delft Geodetic Computing Center, Delft University of Technology, The Netherlands, Aug. 1996, 49 pages.

R. Hatch, "Instantaneous Ambiguity Resolution," Kinematic Systems in Geodesy, Surveying, and Remote Sensing, Symposium No. 107, Banff, Alberta, Canada, Sep. 10-13, 1990, pp. 299-308.

H. Landau et al., "Carrier Phase Ambiguity Resolution using GPS and GLONASS signals," Proceedings of the Institute of Navigation (ION) GPS, Sep. 17, 1996, pp. 917-923.

A. Leick et al., "Processing GLONASS Carrier Phase Observations—Theory and First Experience," Proceedings of the ION Satellite Division, Sep. 15, 1995, pp. 1041-1047.

U. Rossbach, "GLONASS Double Difference Ambiguity Resolution in Real-Time," ION GPS 2000, Sep. 22, 2000, pp. 163-171.

G. Seeber, Satellite Geodesy, 2d Ed., 2003, "7.3.2.3 Resolution of Ambiguities," pp. 269-276.

P. Teunissen et al., "GNSS phase ambiguity validation: A review," 107 IEICE Tech. Rep., vol. 107, No. 2, SANE2007-1, pp. 1-6, Apr. 2007 (2-page English-language abstract).

S. Verhagen, The GNSS integer ambiguities: estimation and validation, Publications on Geodesy 58, Delft, 2005, 194 pages, ISBN-13: 978 90 6132 290 0.

D. Walsh et al., "GPS and GLONASS Carrier Phase Ambiguity Resolution," Proceedings of the Institute of Navigation (ION) GPS, Sep. 17, 1996, pp. 899-907.

J. Wang et al., "A discrimination test proecedure for ambiguity resolution on-the-fly," Journal of Geodesy (1998) 72, pp. 644-653.

Notification of Transmittal of the International Search Report and Written Opinion of the International Searching Authority, dated May 14, 2010, with International Search Report and Written Opinion of the International Searching Authority in International Application No. PCT/US2008/012045 (9 pages).

D. Kozlov et al., "Statistical Characterization of Hardware Biases in GPS+GLONASS Receivers," ION GPS 2000, Sep. 19-22, 2000, Salt Lake City, UT, pp. 817-826.

GENERALIZED PARTIAL FIXING

CROSS REFERENCE TO RELATED APPLICATIONS

This application claims benefit of U.S. Provisional Application 61/001,034, filed 30 Oct. 2007, of Ulrich Vollath for Generalized Partial Fixing, the content of which is incorporated herein by this reference.

The subject matter of this application is related to U.S. Pat. No. 7,312,747, issued 25 Dec. 2007 of Ulrich Vollath and Kenneth Doucet for Multiple GNSS and FDMA High Precision Carrier-Phase Based Positioning, the content of which is incorporated herein by this reference.

The subject matter of this application is related to U.S. Pat. No. 7,432,853, issued 7 Oct. 2008 of Ulrich Vollath for Ambiguity Estimation of GNSS Signals for Three or more Carriers, the content of which is incorporated herein by this reference.

FIELD OF THE INVENTION

The present invention relates to processing of GNSS signal observations, and particularly to estimating integer ambiguities from carrier phase observations of GNSS signals.

BACKGROUND OF THE INVENTION

Overview

The book S. Verhagen, *The GNSS integer ambiguities: estimation and validation*, Delft University of Technology, 2004, provides a good overview of the steps of integer ambiguity estimation. A general model of GNSS observations is:

$$y = Aa + Bb + e \quad (1)$$

Here, $y \in R^m$ denotes the observation vector, $a \in Z^n$ is the vector of unknown integer parameters (ambiguities), $b \in R^p$ is the vector of additional model parameters as position, clock errors, atmospheric errors, time correlated noise, etc. A and B are the m×n respective m×p design matrices (Jacobians) of the observations with respect to the integer respective additional parameters. $e \in R^m$ is the observation noise vector with the a priori variance-covariance matrix $Q = E[ee^T]$ where the matrix dimension is $Q \in R^{m \times m}$.

Float Solution

Normally using a least-squares adjustment, a Kalman filter or any other technique known to someone skilled in the art, the unknowns a and b are estimated simultaneously without applying the integer constraint on a.

The result is the so-called float solution of estimates and their variance-covariance matrix:

$$\begin{pmatrix} \hat{a} \\ \hat{b} \end{pmatrix} \text{ and } \begin{pmatrix} Q_{\hat{a}} & Q_{\hat{a}\hat{b}} \\ Q_{\hat{a}\hat{b}}^T & Q_{\hat{b}} \end{pmatrix} \quad (2)$$

where the matrix dimensions are $Q_{\hat{a}} \in R^{n \times n}$, $Q_{\hat{b}} \in R^{p \times p}$, $Q_{\hat{a}\hat{b}} \in R^{n \times p}$.

A least squares solution would be:

$$\begin{pmatrix} Q_{\hat{a}} & Q_{\hat{a}\hat{b}} \\ Q_{\hat{a}\hat{b}}^T & Q_{\hat{b}} \end{pmatrix} = ((A \quad B)^T Q^{-1} (A \quad B))^{-1} \quad (3)$$

$$\begin{pmatrix} \hat{a} \\ \hat{b} \end{pmatrix} = \begin{pmatrix} Q_{\hat{a}} & Q_{\hat{a}\hat{b}} \\ Q_{\hat{a}\hat{b}}^T & Q_{\hat{b}} \end{pmatrix} (A \quad B)^T Q^{-1} y \quad (4)$$

This technique is given as an example of float parameter estimation and not limiting the application of the methods presented.

Integer Least-Squares (ILS)

The variance-covariance matrix $Q_{\hat{a}}$ defines a norm $\|.\|_{Q_{\hat{a}}}$ on $R^n$:

$$\|x\|_{Q_{\hat{a}}} = x^T Q_{\hat{a}}^{-1} x \quad (5)$$

Integer Least-Squares (ILS) is the strict mathematical integer solution to the problem of minimizing the $Q_{\hat{a}}$ norm of the difference of the float solution to integer solutions:

$$\check{a}_1 = \underset{z \in Z^n}{\mathrm{argmin}}(z - \hat{a})^T Q_{\hat{a}}^{-1}(z - \hat{a}) = \underset{z \in Z^n}{\mathrm{argmin}} \|z - \hat{a}\|_{Q_{\hat{a}}} \quad (6)$$

Well-known algorithms, for example LAMBDA [see P. DeJonge and C. Tiberius, *The lambda method for integer ambiguity estimation: implementation aspects,* 1998], compute at least the "best candidate" $\check{a}_1$. In addition, usually additional next candidate $\check{a}_2$ ("second candidate"), and possible more candidates $\check{a}_3, \ldots, \check{a}_k$ in order of their $Q_{\hat{a}}$ norm are determined, in a similar way:

$$\check{a}_2 = \underset{z \in Z^n \setminus \{\check{a}_1\}}{\mathrm{argmin}} \|z - \hat{a}\|_{Q_{\hat{a}}} \quad (7)$$

$$\check{a}_i = \underset{z \in Z^n \setminus \{\check{a}_1, \ldots, \check{a}_{i-1}\}}{\mathrm{argmin}} \|z - \hat{a}\|_{Q_{\hat{a}}} \quad (8)$$

The values of the norm $\|z - \hat{a}\|_{Q_{\hat{a}}}$ are normally provided, too, for application of the validations tests described in the following section.

For a given best candidate $\check{a}_1$ for the integer solution, the non-integer parameters of the model can be easily adjusted to the matching least-squares solution:

$$\check{b} = \hat{b} - Q_{\hat{a}\hat{b}}^T Q_{\hat{a}}^{-1}(\hat{a} - \check{a}_1) \quad (10)$$

and $$Q_{\check{b}} = Q_{\hat{b}} - Q_{\hat{a}\hat{b}}^T Q_{\hat{a}}^{-1} Q_{\hat{a}\hat{b}} \quad (10)$$

Validation

The purpose of validation is to ensure that the best solution defined by the ILS is also the correct solution with a high probability. This is defined via the success rate, i.e. the probability that the best solution is equal to the correct solution a.

$$P(\check{a}_1 = a) \quad (11)$$

If that probability exceeds an externally given minimum required probability threshold, the integer solution is accepted and in the following used to derive the non-integer parameters, in many applications the position is the primary non-integer parameter of interest.

A common validation technique involves inspecting the best and second candidate solution of the ILS. In one well-known method, the ratio r of the norm of the second best candidate to the norm of the best candidate (the ratio of the $\chi^2$ values) is used a discriminator.

$$r = \frac{\|\check{a}_2 - \hat{a}\|_{Q_{\hat{a}}}}{\|\check{a}_1 - \hat{a}\|_{Q_{\hat{a}}}} \quad (12)$$

The best solution $\check{a}_1$ is considered to be the correct integer solution if the ratio r exceeds a critical value $r_{crit}$:

$$r \geq r_{crit} \quad (13)$$

Another acceptance criterion (see [J. Wang et al, A discrimination test procedure for ambiguity resolution on-the-fly, *Journal of Geodesy*, 72(11), 1998]) uses the difference d of best and second candidate norms:

$$d = \|\check{a}_2 - \hat{a}\|_{Q_{\hat{a}}} - \|\check{a}_1 - \hat{a}\|_{Q_{\hat{a}}} \quad (14)$$

Again, the best solution $\check{a}_1$ is considered to be the correct integer solution if the difference d exceeds a critical value $d_{crit}$:

$$d \geq d_{crit} \quad (15)$$

The determination of the critical values, i.e. the value that must be exceeded to accept the solution as correct can be implemented in many different ways. In common implementations they include: a Fixed Ratio Test or a Fisher test for ratio validation [S. Verhagen, *The GNSS integer ambiguities: estimation and validation*, Delft University of Technology, 2004], a Student-t-test or a standard normal distribution test for the difference of norms [J. Wang et al, A discrimination test procedure for ambiguity resolution on-the-fly, *Journal of Geodesy*, 72(11), 1998]. In some embodiments, the critical values can be determined by Monte-Carlo-Simulations [S. Verhagen, *The GNSS integer ambiguities: estimation and validation*, Delft University of Technology, 2004] or from precomputed tables using properties of the variance-covariance matrix [P. Teunissen et al., GNSS phase ambiguity validation: A review, *Proceedings Space, Aeronautical and Navigational Electronics Symposium SANE*2007, 107(2):1-6, 2007]

Methods taking into account more than two candidates for validation do exist. One example is the Optimal Integer Aperture Estimation (OIAE) [S. Verhagen, *The GNSS integer ambiguities: estimation and validation*, Delft University of Technology, 2004]. Instead of the norm of single candidates sets, $$e^{-\frac{Norm}{2}}$$

of multiple (theoretically all) candidate sets is summed up.

The common property of the computation of critical values is that they typically depend only the variance-covariance-matrix, the number of ambiguities and possibly the over-determination of the float solution but do not depend on the candidates of the ILS. As a consequence, the critical values can be computed before the ILS is executed. Good accounts on possible tests based on first, second (and possibly more) candidates can be found in [S. Verhagen, *The GNSS integer ambiguities: estimation and validation*, Delft University of Technology, 2004].

SUMMARY

This document describes a generalized approach for integer parameter estimation, especially in the context of Global Navigation Satellite Systems (GNSS). The problem solved is the case where a definitively correct integer solution cannot be identified for all ambiguity parameters in a reliable way.

The proposed solution is to apply a linear transformation to the ambiguities (multiply with a matrix) such that the images of the first and the second candidate (or more) are identical. That way, from the first and second (and possibly more) candidates of the integer least-squares solution, a subset of ambiguity combinations is derived that can be fixed. Thus, it is no longer necessary to choose between the solutions as they coincide for the new ambiguities. An advantage of this approach is maximizing all information still available when finally deriving additional parameters such as position, clock error, atmospheric errors and/or time correlated noise.

This technique is applicable to real-time and post-processing applications, as well as to pure GNSS applications, GNSS integrated with other sensors (e.g. INS) and other applications that have to resolve multiple integer ambiguities. This may also apply to optical distance-measurement. GNSS applications include kinematic and static positioning with single base stations as well as with multiple base stations respective reference station networks. They also comprise the integer parameter estimation methods used within the reference station network computations.

Embodiments of the invention provide methods, apparatus, program instructions, and computer-readable media embodying program instruction, for estimating integer ambiguities from carrier phase observations of signals, comprising: determining from the carrier phase observations a ranked plurality of candidate sets of estimated integer ambiguities, applying a criterion to select one of the ranked plurality of candidate sets as a selected candidate set, forming a matrix G such that the image formed when matrix G is linearly combined with a selected candidate set is equal to the image formed when matrix G is linearly combined with a second candidate set, and applying the matrix G to the selected candidate set to determine a modified candidate set of estimated integer ambiguities.

The signals can comprise GNSS signals, such as GNSS signals from at least four satellites. The signals can comprise signals from other sensors, such as Inertial Navigation System (INS) sensors. The signals can comprise optical signals used in optical distance measurement. The signals can comprise GNSS signals observed at multiple reference stations of a reference station network. The processing can be performed in real time (or near real time). The processing can be performed after data collection, as a post-processing operation.

BRIEF DESCRIPTION OF THE DRAWINGS

These and other aspects and features of the present invention will be more readily understood from the embodiments described below with reference to the drawings, in which.

DETAILED DESCRIPTION

Partial Fixing

Figure 1:
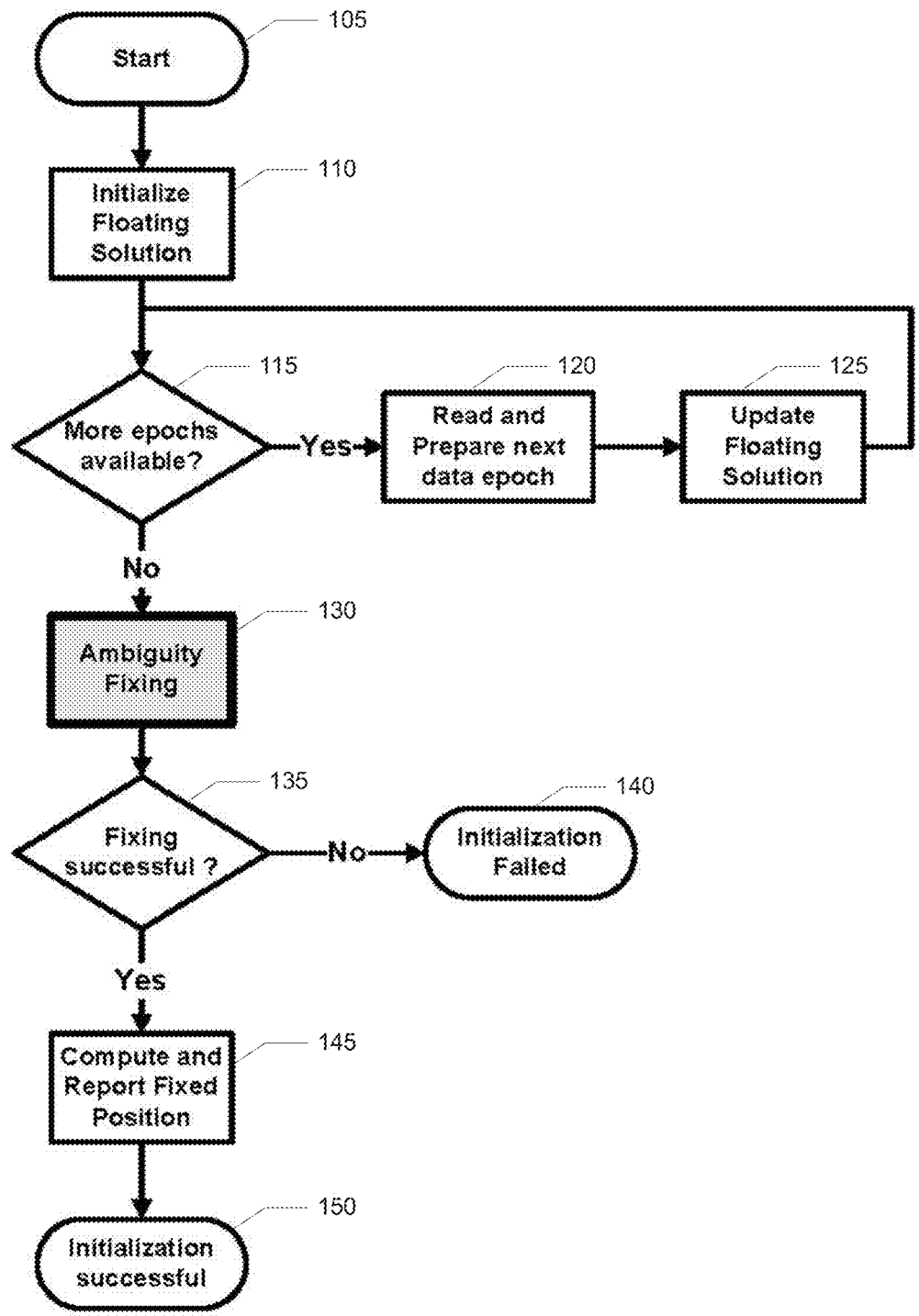
FIG. 1 is a flow chart of post-processing with a sequential float solution.

Partial fixing techniques are described in U.S. Pat. No. 7,312,747, issued 25 Dec. 2007 to Ulrich Vollath and Kenneth Doucet for Multiple GNSS and FDMA High Precision Carrier-Phase Based Positioning.

In the current GNSS ambiguity resolution algorithms, there are some very different approaches to partial fixing. The purpose is always to determine a subset of ambiguities that can be successfully validated as a correct solution with a high probability.

- If the L1 and L2 ambiguities for first and second candidate differ, but their difference is the same, it is possible to fix the wide lane ambiguity.
- If all ambiguities are the same except for one satellite (or a few satellites), all the other satellite ambiguities can be fixed.
- In network processing, if first and second ambiguities are the same except for one station, that station can be removed from the ambiguity resolution. This is done repeatedly in the network processor.
- A more complex approach tries to remove some satellites from an on-the-fly (OTF) solution. After some consistency tests on the multitude of solutions generated, a partial set of satellites might be fixed. This is typically applied in a real-time positioning system to partially fix only the GPS satellite ambiguities if for example the GLONASS satellite ambiguities cannot be fixed yet.
- The most popular application is maybe fixing double difference ambiguities, because the undifferenced respective single-differenced ambiguities cannot be fixed due to the common errors included in the estimates. The partial ambiguities defined as the double differences (satellite to satellite differences of single differences) don't contain these common errors and can be fixed.

Embodiments of the present invention will be presented that comprises and is more general than these methods.

Formalization

The prior-art concept is based on fixing only a subset of $n_f$ of the n ambiguities while leaving the rest "floating". Formally, this is equivalent to handling the unfixed ambiguities as a part of the b vector in equation (2). In detail, the floating solution looks like the following with $\hat{u}$ being the unfixed part of the ambiguities and $\hat{f}$ being the fixed part:

$$\begin{pmatrix} \hat{f} \\ \hat{u} \\ \hat{b} \end{pmatrix} = \begin{pmatrix} Q_{\hat{f}} & Q_{\hat{f}\hat{u}} & Q_{\hat{f}\hat{b}} \\ Q_{\hat{f}\hat{u}}^T & Q_{\hat{u}} & Q_{\hat{u}\hat{b}} \\ Q_{\hat{f}\hat{b}} & Q_{\hat{b}\hat{u}} & Q_{\hat{b}} \end{pmatrix} \quad (16)$$

Integer least squares is applied to the float solution vector $\hat{f}$ together with the variance-covariance matrix $Q_{\hat{f}}$ to get the fixed solution:

$$\check{f} = \underset{z \in Z''}{\operatorname{argmin}}(z - \hat{f})^T Q_{\hat{f}}^{-1}(z - \hat{f}) \quad (17)$$

After validation and fixing the ambiguities to $\check{f}$, the positions are computed similar to equations (9) and (10). Only the covariance parts concerning the fixed ambiguities is determining the position results:

$$\check{b} = \hat{b} - Q_{\hat{f}\hat{b}}^T Q_{\hat{f}}^{-1}(\hat{f} - \check{f}) \quad (18)$$

and $$Q_{\check{b}} = Q_{\hat{b}} - Q_{\hat{f}\hat{b}}^T Q_{\hat{f}}^{-1} Q_{\hat{f}\hat{b}} \quad (19)$$

Matrix Formulation

An alternative formulation of this final step is more general while yielding the same results. Here, a $(n_f \times n)$ matrix maps the ambiguity vector to the part that is going to be fixed.

$$\hat{f} = G\hat{a} = G\begin{pmatrix} \hat{f} \\ \hat{u} \end{pmatrix} \quad (20)$$

$$G = (I, 0) = \begin{pmatrix} 1 & \cdots & 0 & 0 & \cdots & 0 \\ \vdots & \ddots & \vdots & \vdots & \ddots & \vdots \\ 0 & \cdots & 1 & 0 & \cdots & 0 \end{pmatrix} \quad (21)$$

Now, by applying the rules of error propagation, the constraint solution is:

$$\check{b} = \hat{b} - Q_{\hat{a}\hat{b}}^T G^T (G Q_{\hat{a}} G^T)^{-1} G(\hat{a} - \check{a}_1) \quad (22)$$

and $$Q_{\check{b}} = Q_{\hat{b}} - Q_{\hat{a}\hat{b}}^T G^T (G Q_{\hat{a}} G^T)^{-1} G Q_{\hat{a}\hat{b}} \quad (23)$$

With $$Q_{\hat{a}\hat{b}} = \begin{pmatrix} Q_{\hat{f}\hat{b}} \\ Q_{\hat{u}\hat{b}} \end{pmatrix} \quad (24)$$

$$Q_{\hat{a}} = \begin{pmatrix} Q_{\hat{f}} & Q_{\hat{f}\hat{u}} \\ Q_{\hat{f}\hat{u}}^T & Q_{\hat{u}} \end{pmatrix} \quad (25)$$

the results of (18) and (19) are finally yielded.

Widelane Fixing

Another common application of partial fixing is to resolve the ambiguities only for a carrier phase combination known as the widelane. If $N_1$ and $N_2$ are the ambiguities for the frequencies L1 and L2 respectively, then the widelane ambiguity is defined as $$N_W = N_{L1} - N^{L2} \quad (26)$$

The advantage is, that the associated carrier phase combination—the widelane phase—has a wavelength of about 86 cm for GPS. Compared to the some 19 cm on L1 and the some 24 cm on L2 the ambiguity can be resolved more easily in the presence of estimation errors. The way to prepare the float solution vector can again be expressed by a matrix G. If the float solution is setup to contain alternating $N_{L1,i}$ and $N_{L2,i}$ estimates for all ns satellites i $$\begin{pmatrix} N_{L1,1} \\ N_{L2,1} \\ \vdots \\ N_{L1,ns} \\ N_{L2,ns} \end{pmatrix} \quad (27)$$

the following matrix derives the widelane estimates for this common method:

$$G_W = \begin{pmatrix} 1 & -1 & 0 & \ldots & 0 & 0 \\ 0 & 0 & 1 & -1 & 0 & \vdots \\ \vdots & \vdots & \ddots & \ddots & \ddots & 0 \\ 0 & 0 & \ldots & 0 & 1 & -1 \end{pmatrix} \quad (28)$$

Generalized Partial Fixing

The idea of Generalized Partial Fixing (GPF) is new: to use more general matrices for the mapping of the original ambiguities to the ambiguities subset or ambiguity combinations that will be fixed. Especially, a properly defined matrix G can yield to a linear combination of the original ambiguities for which the images of the original first (two or more) candidates are equal. For the case of two candidates, this implies that the linear combination must have a size of one less than the original ambiguity vector as the null space of the mapping performed by the linear combination is one-dimensional.

The null space of a matrix respectively the null space of the associated linear transformation is defined as the set of all vectors that map to the zero vector:

$$\text{nullspace}(G) = \{\vec{x} \in R^n : G\vec{x} = \vec{0}\} \quad (28b)$$

The task is to find a non-zero (n−1)×n matrix G of rank n−1 with (two candidate case):

$$G\check{a}_1 = G\check{a}_2 \quad (29)$$

This is equivalent to:

$$G\Delta\check{a}_2 = \vec{0} \quad (30)$$

with $\Delta\check{a}_2 = \check{a}_1 - \check{a}_2$. In other words, $\Delta\check{a}_2$ is in the null space of G.

For some formulations of the following validation steps, G must only contain integer entries in order to have the resulting transformed ambiguities also as integer numbers. The construction in the next section will show that this is easily achieved.

The matrix G is called the GPF operator, mapping the input ambiguity space of dimension n to the output ambiguity space of dimension n−1.

Construction of G

A GPF operator matrix can be computed in an easy and effective way following the instructions below. Let the candidate difference vector be:

$$\Delta\check{a}_2 = \begin{pmatrix} \delta_1 \\ \vdots \\ \delta_n \end{pmatrix} = \begin{pmatrix} \check{a}_{1_1} - \check{a}_{2_1} \\ \vdots \\ \check{a}_{1_n} - \check{a}_{2_n} \end{pmatrix} \quad (31)$$

For the illustrating examples below it is assumed that all $\delta_i$ are nonzero. Also, it is assumed that at least two ambiguities differ. The detailed descriptions following do not have these restrictions.

The following matrix has all required properties:

$$G_{\Delta\check{a}_2} = \begin{pmatrix} \delta_2 & -\delta_1 & 0 & \ldots & 0 \\ 0 & \delta_3 & -\delta_2 & 0 & \vdots \\ \vdots & \ddots & \ddots & \ddots & 0 \\ 0 & \ldots & 0 & \delta_n & -\delta_{n-1} \end{pmatrix} \quad (32)$$

For non-zero $\delta_i$ the matrix has obviously the full rank n−1. It can also be easily seen that it fulfills the equation $G\Delta\check{a}_2 = \vec{0}$.

Instructions for Construction of G

In detail, the matrix $G_{\Delta\check{a}_2}$ is constructed using the following instructions:

1. Compute the n rows array $\Delta\check{a}_2$ of component-wise differences between first and second candidate.
2. Create a matrix G with n−1 rows and n columns. Set all entries of G to zero. Set the current row index r of G to 1.
3. Go through all n elements $\delta_i$ of $\Delta\check{a}_2$.
    (a) If the current $\delta_i$ is not equal to zero then
        i. If there was already a previous non-zero entry $\delta_p$ in row p, then set the entry at column p and current row r of G to $\delta_i$ and set the entry at column i and current row r of G to $-\delta_p$ and increase the current row index r of G by 1.
        ii. Set the previous non-zero entry $\delta_p$ to the current $\delta_i$. Set the index p of the previous non-zero entry to i.
    (b) If the current $\delta_i$ is equal to zero, then set the entry at column i and current row r of G to 1 and increase the current row index r of G by 1.
4. Return G as the constructed GPF operator matrix.

Alternative G Matrix

Another possible G-Matrix is:

$$G_{\Delta\check{a}_2}' = \begin{pmatrix} \delta_2 & -\delta_1 & 0 & \ldots & 0 \\ \delta_3 & 0 & -\delta_1 & 0 & \vdots \\ \vdots & \ddots & \ddots & \ddots & 0 \\ \delta_{n-1} & \ldots & 0 & 0 & -\delta_1 \end{pmatrix} \quad (33)$$

Alternative Instructions

This matrix version, $G_{\Delta\check{a}_2}'$ is constructed by:

1. Compute the n rows array $\Delta\check{a}_2$ of component-wise differences between first and second candidate.
2. Create a matrix G with n−1 rows and n columns. Set all entries of G to zero. Set the current row index r of G to 1.
3. Go through all n elements $\delta_i$ of $\Delta\check{a}_2$.
    (a) If the current $\delta_i$ is not equal to zero then
        i. If there was already a first non-zero entry $\delta_p$ in row p, then set the entry at column p and current row r of G to $\delta_i$ and set entry at column i and current row r of G to $-\delta_p$ and increase the current row index r of G by 1.

ii. If this is the first non-zero entry, then set the first non-zero entry $\delta_p$ to the current $\delta_i$. Set the index p of the first non-zero entry to i.
  (b) If the current $\delta_i$ is equal to zero, then set the entry at column i and current row r of G to 1 and increase the current row index r of G by 1.
4. Return G as the constructed GPF operator matrix.

Orthogonal G Matrix

If the matrix G shall be orthogonal, i.e. its lines shall be linear independent, the following version can be used:

$$G_{\Delta\breve{a}_2}'' = \begin{pmatrix} \delta_2 & -\delta_1 & \cdots & & 0 \\ \delta_1\delta_3 & \delta_2\delta_3 & -\delta_1^2-\delta_2^2 & & \vdots \\ \vdots & \ddots & \ddots & & 0 \\ \delta_1\delta_n & \cdots & \delta_{n-1}\delta_n & -\delta_1^2 \cdots -\delta_n^2 \end{pmatrix} \quad (34)$$

Instructions for Orthogonal G

For the orthogonal variant, the matrix $G_{\Delta\breve{a}2}$ is constructed as:
1. Compute the n rows array $\Delta\breve{a}_2$ of component-wise differences between first and second candidate.
2. Create a list L of all j indices $l_1, \ldots, l_j$ in $\Delta\breve{a}_2$ with non-zero entries.
3. Create a matrix G with n−1 rows and n columns. Set all entries of G to zero. Set the current row index r of G to 1.
4. Go through all n elements $\delta_i$ of $\Delta\breve{a}_2$.
  (a) If the current $\delta_i$ is not equal to zero then
    i. If this is the second non-zero entry besides the first one $\delta_p$ in row p, then:
      A. set the entry at column p and current row r of G to $\delta_i$
      B. set entry at column i and current row r of G to $-\delta_p$
      C. increase the current row index r of G by 1.
    ii. If there were already at least two previous non-zero entries $\delta_p$ in row p, then:
      A. set the columns j with j set to all values from 1 to i−1 of the current row r of G to $\delta_1\delta_j$
      B. set the column i of the current row r of G to $-\delta_p - \ldots -\delta_i$
      C. increase the current row index r of G by 1.
    iii. Set the previous non-zero entry $\delta_p$ to the current $\delta_i$. Set the index p of the previous non-zero entry to i.
  (b) If the current $\delta_i$ is equal to zero, then set the entry at column i and current row r of G to 1 and increase the current row index r of G by 1.
5. Return G as the constructed GPF operator matrix.

Choice and Final Preparation of G

In the following, any of those three realizations of the G matrix can be used.

For compact results, i.e., to get small integer entries, the b may also be divided by their greatest common divisor for each row of G values, because with $G\Delta\breve{a}_2 = \vec{0}$ also $$\begin{pmatrix} \alpha_1 & 0 & 0 \\ 0 & \ddots & 0 \\ 0 & 0 & \alpha_{n-1} \end{pmatrix} G\Delta\breve{a}_2 = \begin{pmatrix} \alpha_1 & 0 & 0 \\ 0 & \ddots & 0 \\ 0 & 0 & \alpha_{n-1} \end{pmatrix} \vec{0} = \vec{0},$$

i.e. the null space of G is identical to the null space of $$\begin{pmatrix} \alpha_1 & 0 & 0 \\ 0 & \ddots & 0 \\ 0 & 0 & \alpha_{n-1} \end{pmatrix} G$$

if all the $\alpha_i \neq 0$; $1 \leq i \leq n-1$.

Examples of GPF Matrix Computations

The following paragraphs give examples of computing the GPF matrices for illustration of the given algorithms. The examples are given for a four ambiguity case. Different entries are chosen to be zero to show the different computations.

Standard GPF Matrix

All Entries Non-Zero

Step 1.: Compute the 4 rows array $\Delta\breve{a}_2$ of component-wise differences between first and second candidate.

$$\Delta\breve{a}_2 = \begin{pmatrix} \delta_1 \\ \delta_2 \\ \delta_3 \\ \delta_4 \end{pmatrix}$$

with all entries non-zero.

Step 2.: Create a matrix G with 3 rows and 4 columns. Set all entries of G to zero.

$$G = \begin{pmatrix} 0 & 0 & 0 & 0 \\ 0 & 0 & 0 & 0 \\ 0 & 0 & 0 & 0 \end{pmatrix}$$

Set the current row index r of G to 1.
  r = 1
Step 3.: Go through all n elements of $\Delta\breve{a}_2$.
  Step 3. for $\delta_i = \delta_1$:
    Step 3. (a) applies: $\delta_i \neq 0$
      Step 3.(a) i. does not apply, no previous $\delta_p$
      Step 3.(a) ii. Set the previous non-zero entry $\delta_p$ to the current $\delta_i$.
        $\delta_p = \delta_1$
        Set the index p of the previous non-zero entry to i.
        p = 1
    Step 3. (b) does not apply: $\delta_i \neq 0$
  Step 3. for $\delta_i = \delta_2$:
    Step 3. (a) applies: $\delta_i \neq 0$
      Step 3.(a) i. applies, previous $\delta_p$ exists.
        Set the entry at column 1 and current row 1 of G to $\delta_2$ and set the entry at column 2 and current row 1 of G to $-\delta_1$.

$$G = \begin{pmatrix} \delta_2 & -\delta_1 & 0 & 0 \\ 0 & 0 & 0 & 0 \\ 0 & 0 & 0 & 0 \end{pmatrix}$$

Increase the current row index r of G by 1.
  r = 2
Step 3.(a) ii. Set the previous non-zero entry $\delta_p$ to the current $\delta_i$.
  $\delta_p = \delta_2$
  Set the index p of the previous non-zero entry to i.
  p = 2
Step 3. (b) does not apply: $\delta_i \neq 0$
Step 3. for $\delta_i = \delta_3$:
  Step 3. (a) applies: $\delta_i \neq 0$
    Step 3.(a) i. applies, previous $\delta_p$ exists
      Set the entry at column 2 and current row 2 of G to $\delta_3$ and set the entry at column 3 and current row 2 of G to $-\delta_2$.

$$G = \begin{pmatrix} \delta_2 & -\delta_1 & 0 & 0 \\ 0 & \delta_3 & -\delta_2 & 0 \\ 0 & 0 & 0 & 0 \end{pmatrix}$$

Increase the current row index r of G by 1.
r = 3
Step 3.(a) ii. Set the previous non-zero entry $\delta_p$ to the current $\delta_i$.
$\delta_p = \delta_3$
Set the index p of the previous non-zero entry to i.
p = 3
Step 3. (b) does not apply: $\delta_i \neq 0$
Step 3. for $\delta_i = \delta_4$:
  Step 3. (a) applies: $\delta_i \neq 0$
    Step 3. (a) i. applies, previous $\delta_p$ exists
    Set the entry at column 3 and current row 3 of G to $\delta_4$ and
    set the entry at column 4 and current row 3 of G to $-\delta_3$.

$$G = \begin{pmatrix} \delta_2 & -\delta_1 & 0 & 0 \\ 0 & \delta_3 & -\delta_2 & 0 \\ 0 & 0 & \delta_4 & -\delta_3 \end{pmatrix}$$

Increase the current row index r of G by 1.
r = 4
Step 3.(a) ii. Set the previous non-zero entry $\delta_p$ to the current $\delta_i$.
$\delta_p = \delta_4$
Set the index p of the previous non-zero entry to i.
p = 4
Step 3. (b) does not apply: $\delta_i \neq 0$
Step 4.: Final result $$G = \begin{pmatrix} \delta_2 & -\delta_1 & 0 & 0 \\ 0 & \delta_3 & -\delta_2 & 0 \\ 0 & 0 & \delta_4 & -\delta_3 \end{pmatrix}$$

Result check:

$$G\Delta\breve{a}_2 = \begin{pmatrix} \delta_2 & -\delta_1 & 0 & 0 \\ 0 & \delta_3 & -\delta_2 & 0 \\ 0 & 0 & \delta_4 & -\delta_3 \end{pmatrix} \begin{pmatrix} \delta_1 \\ \delta_2 \\ \delta_3 \\ \delta_4 \end{pmatrix} = \begin{pmatrix} 0 \\ 0 \\ 0 \end{pmatrix}$$

First Entry Zero

Step 1.: Compute the 4 rows array $\Delta\breve{a}_2$ of component-wise differences between first and second candidate.

$$\Delta\breve{a}_2 = \begin{pmatrix} 0 \\ \delta_2 \\ \delta_3 \\ \delta_4 \end{pmatrix}$$

Step 2.: Create a matrix G with 3 rows and 4 columns. Set all entries of G to zero.

$$G = \begin{pmatrix} 0 & 0 & 0 & 0 \\ 0 & 0 & 0 & 0 \\ 0 & 0 & 0 & 0 \end{pmatrix}$$

Set the current row index r of G to 1.
r = 1
Step 3.: Go through all n elements of $\Delta\breve{a}_2$.
  Step 3. for $\delta_i = \delta_1$:
    Step 3. (a) does not apply: $\delta_i = 0$
    Step 3. (b) applies: $\delta_i \neq 0$
      Set the entry at column 1 and current row 1 of G to 1.

$$G = \begin{pmatrix} 1 & 0 & 0 & 0 \\ 0 & 0 & 0 & 0 \\ 0 & 0 & 0 & 0 \end{pmatrix}$$

Increase the current row index r of G by 1.
r = 2

Step 3. for $\delta_i = \delta_2$:
  Step 3. (a) applies: $\delta_i \neq 0$
    Step 3.(a) i. does not apply, no previous $\delta_p$
    Step 3.(a) ii. Set the previous non-zero entry $\delta_p$ to the current $\delta_i$.
    $\delta_p = \delta_2$
    Set the index p of the previous non-zero entry to i.
    p = 2
  Step 3. (b) does not apply: $\delta_i \neq 0$
Step 3. for $\delta_i = \delta_3$:
  Step 3. (a) applies: $\delta_i \neq 0$
    Step 3.(a) i. applies, previous $\delta_p$ exists
    Set the entry at column 2 and current row 2 of G to $\delta_3$ and
    set the entry at column 3 and current row 2 of G to $-\delta_2$.

$$G = \begin{pmatrix} 1 & 0 & 0 & 0 \\ 0 & \delta_3 & -\delta_2 & 0 \\ 0 & 0 & 0 & 0 \end{pmatrix}$$

Increase the current row index r of G by 1.
r = 3
Step 3.(a) ii. Set the previous non-zero entry $\delta_p$ to the current $\delta_i$.
$\delta_p = \delta_3$
Set the index p of the previous non-zero entry to i.
p = 3
Step 3. (b) does not apply: $\delta_i \neq 0$
Step 3. for $\delta_i = \delta_4$:
  Step 3. (a) applies: $\delta_i \neq 0$
    Step 3.(a) i. applies, previous $\delta_p$ exists
    Set the entry at column 3 and current row 3 of G to $\delta_4$ and
    set the entry at column 4 and current row 3 of G to $-\delta_3$.

$$G = \begin{pmatrix} 1 & 0 & 0 & 0 \\ 0 & \delta_3 & -\delta_2 & 0 \\ 0 & 0 & \delta_4 & -\delta_3 \end{pmatrix}$$

Increase the current row index r of G by 1.
r = 4
Step 3.(a) ii. Set the previous non-zero entry $\delta_p$ to the current $\delta_i$.
$\delta_p = \delta_4$
Set the index p of the previous non-zero entry to i.
p = 4
Step 3. (b) does not apply: $\delta_i \neq 0$
Step 4.: Final result $$G = \begin{pmatrix} 1 & 0 & 0 & 0 \\ 0 & \delta_3 & -\delta_2 & 0 \\ 0 & 0 & \delta_4 & -\delta_3 \end{pmatrix}$$

Result check:

$$G\Delta\breve{a}_2 = \begin{pmatrix} 1 & 0 & 0 & 0 \\ 0 & \delta_3 & -\delta_2 & 0 \\ 0 & 0 & \delta_4 & -\delta_3 \end{pmatrix} \begin{pmatrix} 0 \\ \delta_2 \\ \delta_3 \\ \delta_4 \end{pmatrix} = \begin{pmatrix} 0 \\ 0 \\ 0 \end{pmatrix}$$

Second Entry Zero

Step 1.: Compute the 4 rows array $\Delta\breve{a}_2$ of component-wise differences between first and second candidate.

$$\Delta\breve{a}_2 = \begin{pmatrix} \delta_1 \\ 0 \\ \delta_3 \\ \delta_4 \end{pmatrix}$$

Step 2.: Create a matrix G with 3 rows and 4 columns. Set all entries of G to zero.

$$G = \begin{pmatrix} 0 & 0 & 0 & 0 \\ 0 & 0 & 0 & 0 \\ 0 & 0 & 0 & 0 \end{pmatrix}$$

Set the current row index r of G to 1.
  r = 1
Step 3.: Go through all n elements of $\Delta\breve{a}_2$.
  Step 3. for $\delta_i = \delta_1$:
    Step 3. (a) applies: $\delta_i \neq 0$
      Step 3.(a) i. does not apply, no previous $\delta_p$
      Step 3.(a) ii. Set the previous non-zero entry $\delta_p$ to the current $\delta_i$.
        $\delta_p = \delta_1$
      Set the index p of the previous non-zero entry to i.
        p = 1
    Step 3. (b) does not apply: $\delta_i \neq 0$
  Step 3. for $\delta_i = \delta_2$:
    Step 3. (a) does not apply: $\delta_i = 0$
    Step 3. (b) applies: $\delta_i = 0$
      Set the entry at column 2 and current row 1 of G to 1.

$$G = \begin{pmatrix} 0 & 1 & 0 & 0 \\ 0 & 0 & 0 & 0 \\ 0 & 0 & 0 & 0 \end{pmatrix}$$

Increase the current row index r of G by 1.
        r = 2
  Step 3. for $\delta_i = \delta_3$:
    Step 3. (a) applies: $\delta_i \neq 0$
      Step 3.(a) i. applies, previous $\delta_p$ exists
      Set the entry at column 1 and current row 2 of G to $\delta_3$ and set the entry at column 3 and current row 2 of G to $-\delta_1$.

$$G = \begin{pmatrix} 0 & 1 & 0 & 0 \\ \delta_3 & 0 & -\delta_1 & 0 \\ 0 & 0 & 0 & 0 \end{pmatrix}$$

Increase the current row index r of G by 1.
        r = 3
      Step 3.(a) ii. Set the previous non-zero entry $\delta_p$ to the current $\delta_i$.
        $\delta_p = \delta_3$
      Set the index p of the previous non-zero entry to i.
        p = 3
    Step 3. (b) does not apply: $\delta_i \neq 0$
  Step 3. for $\delta_i = \delta_4$:
    Step 3. (a) applies: $\delta_i \neq 0$
      Step 3.(a) i. applies, previous $\delta_p$ exists
      Set the entry at column 3 and current row 3 of G to $\delta_4$ and set the entry at column 4 and current row 3 of G to $-\delta_3$.

$$G = \begin{pmatrix} 0 & 1 & 0 & 0 \\ \delta_3 & 0 & -\delta_1 & 0 \\ 0 & 0 & \delta_4 & -\delta_3 \end{pmatrix}$$

Increase the current row index r of G by 1.
        r = 4
      Step 3.(a) ii. Set the previous non-zero entry $\delta_p$ to the current $\delta_i$.
        $\delta_p = \delta_4$
      Set the index p of the previous non-zero entry to i.
        p = 4
    Step 3. (b) does not apply: $\delta_i \neq 0$
Step 4.: Final result $$G = \begin{pmatrix} 0 & 1 & 0 & 0 \\ \delta_3 & 0 & -\delta_1 & 0 \\ 0 & 0 & \delta_4 & -\delta_3 \end{pmatrix}$$

Result check:

$$G\Delta\breve{a}_2 = \begin{pmatrix} 0 & 1 & 0 & 0 \\ \delta_3 & 0 & -\delta_1 & 0 \\ 0 & 0 & \delta_4 & -\delta_3 \end{pmatrix} \begin{pmatrix} \delta_1 \\ 0 \\ \delta_3 \\ \delta_4 \end{pmatrix} = \begin{pmatrix} 0 \\ 0 \\ 0 \end{pmatrix}$$

Last Entry Zero

Step 1.: Compute the 4 rows array $\Delta\breve{a}_2$ of component-wise differences between first and second candidate.

$$\Delta\breve{a}_2 = \begin{pmatrix} \delta_1 \\ \delta_2 \\ \delta_3 \\ 0 \end{pmatrix}$$

Step 2.: Create a matrix G with 3 rows and 4 columns. Set all entries of G to zero.

$$G = \begin{pmatrix} 0 & 0 & 0 & 0 \\ 0 & 0 & 0 & 0 \\ 0 & 0 & 0 & 0 \end{pmatrix}$$

Set the current row index r of G to 1.
  r = 1
Step 3.: Go through all n elements of $\Delta\breve{a}_2$.
  Step 3. for $\delta_i = \delta_1$:
    Step 3. (a) applies: $\delta_i \neq 0$
      Step 3.(a) i. does not apply, no previous $\delta_p$
      Step 3.(a) ii. Set the previous non-zero entry $\delta_p$ to the current $\delta_i$.
        $\delta_p = \delta_1$
      Set the index p of the previous non-zero entry to i.
        p = 1
    Step 3. (b) does not apply: $\delta_i \neq 0$
  Step 3. for $\delta_i = \delta_2$:
    Step 3. (a) applies: $\delta_i \neq 0$
      Step 3.(a) i. applies, previous $\delta_p$ exists
      Set the entry at column 1 and current row 1 of G to $\delta_2$ and set the entry at column 2 and current row 1 of G to $-\delta_1$.

$$G = \begin{pmatrix} \delta_2 & -\delta_1 & 0 & 0 \\ 0 & 0 & 0 & 0 \\ 0 & 0 & 0 & 0 \end{pmatrix}$$

Increase the current row index r of G by 1.
        r = 2
      Step 3.(a) ii. Set the previous non-zero entry $\delta_p$ to the current $\delta_i$.
        $\delta_p = \delta_2$
      Set the index p of the previous non-zero entry to i.
        p = 2
    Step 3. (b) does not apply: $\delta_i \neq 0$
  Step 3. for $\delta_i = \delta_3$:
    Step 3. (a) applies: $\delta_i \neq 0$
      Step 3.(a) i. applies, previous $\delta_p$ exists
      Set the entry at column 2 and current row 2 of G to $\delta_3$ and set the entry at column 3 and current row 2 of G to $-\delta_2$.

$$G = \begin{pmatrix} \delta_2 & -\delta_1 & 0 & 0 \\ 0 & \delta_3 & -\delta_2 & 0 \\ 0 & 0 & 0 & 0 \end{pmatrix}$$

Increase the current row index r of G by 1.
        r = 3
      Step 3.(a) ii. Set the previous non-zero entry $\delta_p$ to the current $\delta_i$.
        $\delta_p = \delta_3$
      Set the index p of the previous non-zero entry to i.
        p = 3

-continued

Step 3. (b) does not apply: $\delta_i \neq 0$
Step 3. for $\delta_i = \delta_4$:
    Step 3. (a) does not apply: $\delta_i = 0$
    Step 3. (b) does apply: $\delta_i = 0$
        Set the entry at column 4 and current row 3 of G to 1.

$$G = \begin{pmatrix} \delta_2 & -\delta_1 & 0 & 0 \\ 0 & \delta_3 & -\delta_2 & 0 \\ 0 & 0 & 0 & 1 \end{pmatrix}$$

Increase the current row index r of G by 1.
r = 4
Step 4.: Final result $$G = \begin{pmatrix} \delta_2 & -\delta_1 & 0 & 0 \\ 0 & \delta_3 & -\delta_2 & 0 \\ 0 & 0 & 0 & 1 \end{pmatrix}$$

Result check:

$$G\Delta \check{a}_2 = \begin{pmatrix} \delta_2 & -\delta_1 & 0 & 0 \\ 0 & \delta_3 & -\delta_2 & 0 \\ 0 & 0 & 0 & 1 \end{pmatrix} \begin{pmatrix} \delta_1 \\ \delta_2 \\ \delta_3 \\ 0 \end{pmatrix} = \begin{pmatrix} 0 \\ 0 \\ 0 \end{pmatrix}.$$

Computation of the Additional Model Parameters

After fixing using the GPF method, the final task is to determine the updated additional model parameters. For example, if the position is the result of interest in positioning applications, the position has to be updated to the accuracy achieved using a fixed solution.

The new solution for the non-integer parameters b is computed as:

$$\check{b}_G = \hat{b} - Q_{\hat{a}\hat{b}}^T G^T (G Q_{\hat{a}} G^T)^{-1} G(\hat{a} - \check{a}_1) \quad (35)$$

This is used to apply the partial fix to the floating solution results in order to compute the associated (partially) fixed position solution.

For the variance-covariance matrix of the non-integer parameters the updated result is:

$$Q_{\check{b}_G} = Q_{\hat{b}} - Q_{\hat{a}\hat{b}}^T G^T (G Q_{\hat{a}} G^T)^{-1} G Q_{\hat{a}\hat{b}} \quad (36)$$

This specifies the accuracy obtained for the additional model parameters after applying the partial fix.

Additional Validation Step

After application of the GPF the ambiguity resolution is not done yet. At this point in time just a partial solution has been computed. It still has to be proven that the partial solution is correct within the required probability limits.

Candidate Validation 3.2.1 Let the initial ILS search return the three best candidates $\check{a}_1$, $\check{b}_1$ and $\check{a}_3$. If the third best candidate $\check{a}_3$ is sufficiently improbable as a solution compared to the best solution $\check{a}_1$, the GPF solution $G\check{a}_1$—combining the probabilities of first and second candidate—can be validated and fixed. This is implemented by using the same validation test that was used originally for the first two candidates. For the ratio test, the result is a new ratio $r_G$:

$$r_G = \frac{\|\check{a}_3 - \hat{a}\|_{Q_{\hat{a}}}}{\|\check{a}_1 - \hat{a}\|_{Q_{\hat{a}}}} \quad (37)$$

The partial solution $G\check{a}_1$ is considered to be the correct integer solution if the ratio $r_G$ exceeds the critical value $r_{crit}$:

$$r_G \geq r_{crit} \quad (38)$$

For the difference acceptance criterion, the difference $d_G$ is:

$$d_G = \|\check{a}_3 - \hat{a}\|_{Q_{\hat{a}}} - \|\check{a}_1 - \hat{a}\|_{Q_{\hat{a}}} \quad (39)$$

Again, the partial solution $G\check{a}_1$ is considered to be the correct integer solution if the difference $d_G$ exceeds the critical value $d_{crit}$:

$$d_G \geq d_{crit} \quad (40)$$

Search Validation 3.2.2 Another validation technique presented in this section does not require computing a third best candidate. Instead, the ILS is repeated on the modified ambiguity vector to get a new best and second best candidate. This is followed by the normal validation step. If the validation succeeds, the GPF was successful. For this method it is required that the matrix G has only integer coefficients in order to have only integer solutions in the transformed ambiguity space.

In case of a validation failure, the GPF procedure can be repeated to generate another new ambiguity vector with a dimension again one less than the modified ambiguities. This can be iterated until too few ambiguities are remaining in the solution so that the final parameters (usually the position) can no longer be determined accurately enough, or less than two ambiguity entries remain.

For every iteration step, the new float solution â' is computed:

$$\hat{a}' = G \cdot \hat{a} \quad (41)$$

The associated variance-covariance matrix G is:

$$Q_{\hat{a}'} = G \cdot Q_{\hat{a}} G^T \quad (42)$$

For the new float solution, the best solution according to ILS is:

$$\check{a}_{1'} = \operatorname*{argmin}_{z \in \mathbb{Z}^{n-1}} \|z - \hat{a}'\|_{Q_{\hat{a}'}} \quad (43)$$

Similar, the new second candidate is:

$$\check{a}_{2'} = \operatorname*{argmin}_{z \in \mathbb{Z}^{n-1} \setminus \{\check{a}_{1'}\}} \|z - \hat{a}'\|_{Q_{\hat{a}'}} \quad (44)$$

3.3 Multiple Candidates

Generally, more that the two best candidates could be possible integer solution with a sufficient probability. In principle, this could be solved by iterating the GPF algorithm until a good separation of best and second candidate is achieved or no ambiguities are left to remove from the solution. If all candidates are computed that are probable integer solutions for the given floating solution, a direct method can immediately produce a GPF fix without the iteration from the search validation and without giving up because the candidate validation with three candidates has failed.

When ratio validation with a critical ratio $r_{crit}$ is used, this collection $\{\check{a}_1, \ldots, \check{a}_k\}$ of all k probable integer solutions can be characterized as:

$$\{\breve{a}_1, \ldots, \breve{a}_k\} = \left\{ z \in Z^n : \frac{\|z - \hat{a}\|_{Q_{\hat{a}}}}{\|\breve{a}_1 - \hat{a}\|_{Q_{\hat{a}}}} < r_{crit} \right\} \quad (45)$$

Similarly, the collection $\{\breve{a}_1, \ldots, \breve{a}_k\}$ for the difference validation method with critical value $d_{crit}$ is:

$$\{\breve{a}_1, \ldots, \breve{a}_k\} = \{z \in Z^n : \|z - \hat{a}\|_{Q_{\hat{a}}} - \|\breve{a}_1 - \hat{a}\|_{Q_{\hat{a}}} < d_{crit}\} \quad (46)$$

This Integer Least Squares mechanization for more than two candidates using a predefined critical value is called Integer Least Squares Collection (ILSC).

The construction of G can be easily generalized for k>2 candidates. First of all, only k−1 independent differences have to be explicitly in the null space of G. With $\breve{a}_1 - \breve{a}_i$ and $\breve{a}_1 - \breve{a}_j$ all linear combinations are in the null space, too, especially $$\breve{a}_i - \breve{a}_j = (\breve{a}_1 - \breve{a}_j) - (\breve{a}_1 - \breve{a}_i) \quad (47)$$

Thus, for the construction only the k−1 differences $\Delta_i$ are needed:

$$\Delta_i = \breve{a}_1 - \breve{a}_{i+1}, i = 1, \ldots, k-1 \quad (48)$$

They will be in the null space of the G matrix:

$$G \cdot \Delta_i = 0 \quad (49)$$

The row dimension of G will now be m=n−k+1, as one dimension is used up for each independent pair of candidates. Obviously k must be smaller than or equal to n.

The multiple candidates G matrix $G_{\Delta_1, \ldots, \Delta_{k-1}}$ is computed by:

$$G_{\Delta_1, \ldots, \Delta_{k-1}} = G_{k-1} \quad (50)$$

with the iteration:

$$G_1 = G_{\Delta_1} \quad (51)$$

$$G_i = G_{G_{i-1} \cdot \Delta_i} \cdot G_{i-1}, i = 2, \ldots, k-1 \quad (52)$$

The Complete Method

This section uses the solutions described so far to present the complete work flow of using GPF in different variants.

Complete Method using Candidate Validation

For the candidate validation variant from section 3.2.1 the complete method is:
1. Compute a float solution like for the standard ambiguity resolution methods
2. Compute at least the best and second best Integer Least-Squares solutions. Possibly compute all candidates within the predefined critical value determined by the chosen validation method.
3. Decide if the best solution can be validated using one of the state-of-the-art methods
    (a) If the best solution can be validated, fix the ambiguities to the best solution and continue computing fixed positions.
    (b) In addition to the candidates computed in step 2, compute all candidates within the predefined critical value determined by the chosen validation method. Compute at least up to the third candidate, and maximally n candidates.
    (c) If the number of candidates found to be below the critical value is less or equal to n, transform the first candidate solution and the variance-covariance matrix using the G matrix.
    (d) If more than n candidates exist below the critical value, ambiguity resolution fails.
4. Fix the ambiguity combinations defined by G.

Complete Method using Search Validation

Using the search validation method from section 3.2.2, the complete work flow is:
1. Compute a float solution like for the standard ambiguity resolution methods
2. Compute the best and second best Integer Least-Squares solutions
3. Decide if the best solution can be validated using one of the state-of-the-art methods
    (a) If the best solution can be validated, fix the ambiguities to the best solution and continue computing fixed positions.
    (b) If the best solution cannot be validated and the floating solution has at least two entries, compute the GPF matrix G using the defined instruction above.
    (c) If the best solution cannot be validated and the floating solution has less than two entries, the ambiguity resolution fails.
4. Transform the floating solution and the variance-covariance matrix using the G matrix.
5. Repeat the process at step 2 using the modified floating solution and variance-covariance matrix.

Examples

The following sections give examples of the application of Generalized Partial Fixing to the existing and for new problems.

Wide-Lane

Both L1 and L2 ambiguities N1 and N2 have the same difference $\delta$ for first and second candidate.

$$\Delta \breve{a}_2 = \begin{pmatrix} N1_{best} - N1_{second} \\ N2_{best} - N2_{second} \end{pmatrix} = \begin{pmatrix} \delta \\ \delta \end{pmatrix} \quad (53)$$

Thus $$G = (\delta, -\delta) \quad (54)$$

As the Null-space doesn't change when G is multiplied with a non-zero factor, the following matrix can be used as well:

$$G' = \frac{1}{\delta} G = (1, -1) \quad (55)$$

This transforms the fixed ambiguity combination to be the wide lane combination.

Single Satellite Rejection

If only one ambiguity is different, by definition of the GPF method that ambiguity is left out of the fixing process.

Complex Example

Let's assume there is a common bias on all ambiguities. This would for example be the case when one attempts to fix the single-differenced ambiguities directly.

$$\Delta = \begin{pmatrix} \delta \\ \vdots \\ \delta \end{pmatrix} \quad (56)$$

As the delta can be normalized by division by their GCD, we can assume δ=1. Applying GPF, the transformation becomes:

$$G = \begin{pmatrix} 1 & -1 & 0 & \cdots & 0 \\ 0 & 1 & -1 & 0 & \vdots \\ \vdots & \ddots & \ddots & \ddots & 0 \\ 0 & \cdots & 0 & 1 & -1 \end{pmatrix} \quad (57)$$

This becomes an interesting variation of double-differencing the originally single-differenced estimates. Instead of having one common reference satellite for all other observations, a new reference satellite is used for each of the new ambiguity combinations. It can probably be shown that the approach is equivalent to the classical approach, and thus double-differencing follows implicitly from GPF. Actually, a different construction of G also fulfilling the GPF requirements would directly lead to the differencing operator:

$$G = \begin{pmatrix} \delta_2 & -\delta_1 & 0 & \cdots & 0 \\ \delta_3 & 0 & -\delta_1 & 0 & \vdots \\ \vdots & \ddots & \ddots & \ddots & 0 \\ \delta_{n-1} & \cdots & 0 & 0 & -\delta_1 \end{pmatrix} \quad (58)$$

DESCRIPTION OF THE DRAWINGS

Figure 2:
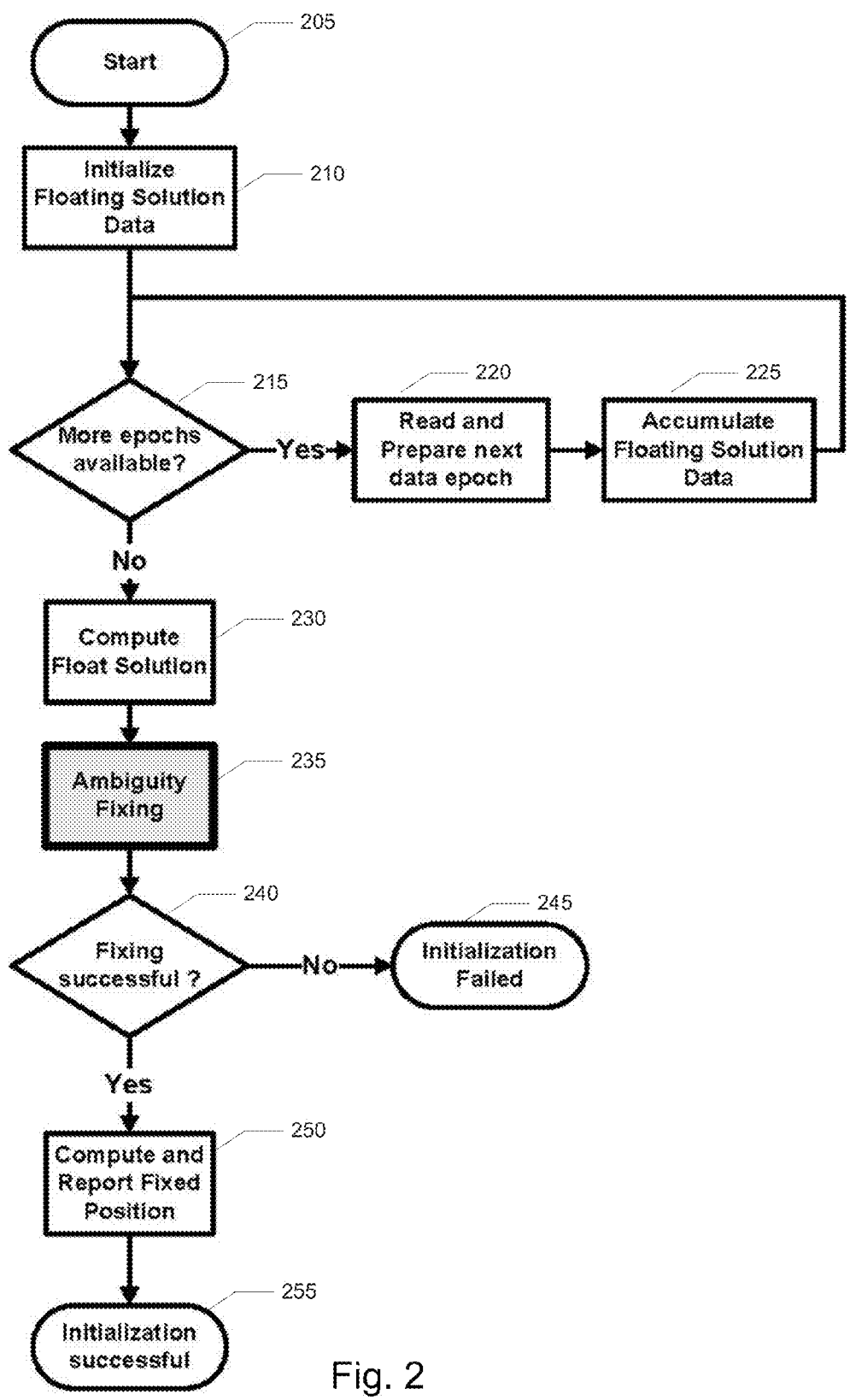
FIG. 2 is a flow chart of post-processing with a batch least squares approach.
Figure 3:
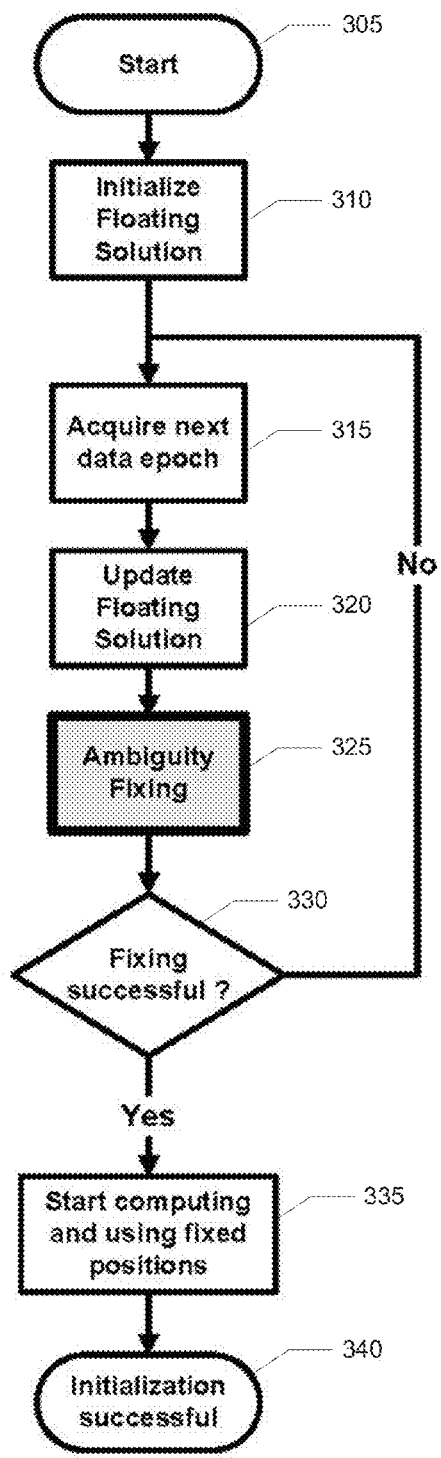
FIG. 3 is a flow chart of real-time processing.

In FIG. 1, FIG. 2 and FIG. 3 some implementations using ambiguity fixing are shown. Prior art versions of these use a standard ambiguity fixing block (emphasized with darker outlining in the figures). The ambiguity fixing block is improved by the GPF method in accordance with embodiments of the present invention.

FIG. 1 displays a prior art method for post processing GNSS data using a sequential float solution, for example a Kalman filter. The float solution is updated for every GNSS data epoch read from the data storage. The result is available immediately after all GNSS data epoch have been read and processed.

Referring to FIG. 1, the process flow starts at step 105. The floating solution is initialized at step 110. Step 115 checks whether more epochs of data are available. If yes, at step 120 the data is read and the next data epoch is prepared. Step 125 then updates the floating solution with the data epoch prepared at step 120. When no more epochs of data are available, ambiguity fixing is attempted at step 130. Step 135 checks whether ambiguity fixing was successful. If no, the initialization is determined to have failed at step 140. If yes, at step 145 a position is computed using the fixed ambiguities and reported. Initialization ends successfully at step 150.

FIG. 2 shows an alternative prior art post processing formulation. Here, all the GNSS data epochs are accumulated, but not completely processed. This is finally done using a batch least squares method after all data had been accumulated, finally yielding the float solution.

Referring to FIG. 2, the process flow starts at step 205. The floating solution is initialized at step 210. Step 215 checks whether more epochs of data are available. If yes, at step 220 the data is read and the next data epoch is prepared. Step 225 then accumulates the floating solution data. When no more epochs of data are available, the float solution is computed at step 230. Ambiguity fixing is then attempted at step 235. Step 240 checks whether ambiguity fixing was successful. If no, the initialization is determined to have failed at step 245. If yes, at step 250 a position is computed using the fixed ambiguities and reported. Initialization ends successfully at step 255.

FIG. 3 is a flow chart of real-time processing. For every new GNSS data epoch, ambiguity fixing is attempted. If successful, a fixed position can be computed and reported. If not, the process is repeated whenever the next data epoch is available.

Referring to FIG. 3, the process flow starts at step 305. The floating solution is initialized at step 310. A next epoch of data is acquired at step 315. Step 320 updates the floating solution with the data acquired at step 315. Ambiguity fixing is then attempted at step 325. Step 330 checks whether ambiguity fixing was successful. If no, the flow returns to step 315 to acquire a next epoch of data. If yes, at step 335 a position is computed using the fixed ambiguities and reported. Initialization ends successfully at step 340.

Figure 4:
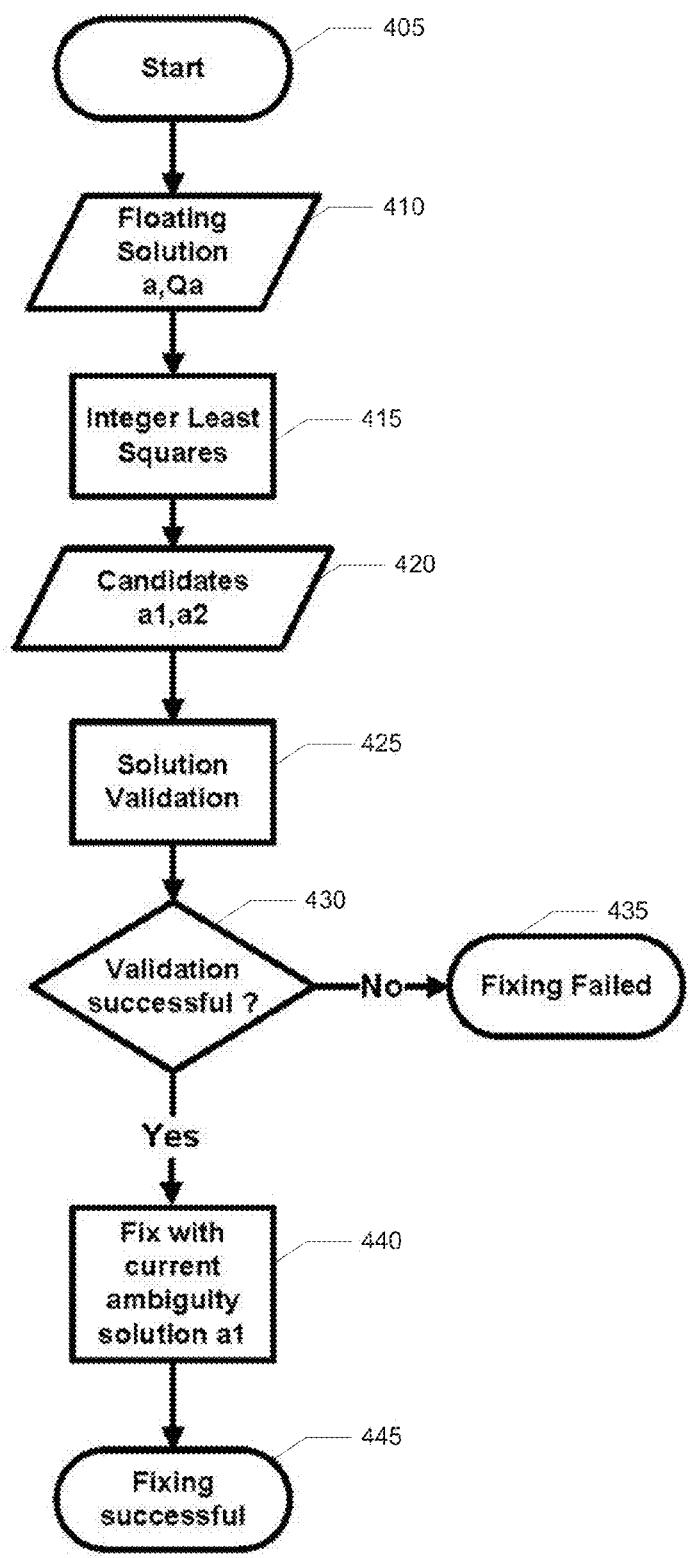
FIG. 4 is a flow chart of conventional fixing.

FIG. 4 is a flow chart of a prior art ambiguity fixing process. The floating solution, for example computed by one of the methods shown in FIG. 1, FIG. 2 and FIG. 3, is used to determine a best and second ambiguity solution in the Integer Least Squares process. If the final validation succeeds, the solution is accepted and used, if not, no fixed solution can be computed.

Referring to FIG. 4, the process flow starts at step 405. The floating solution is initialized at step 410 with values for parameters a and Qa. An Integer Least Squares adjustment is computed at step 415 to determine best candidate $a_1$ and second best candidate $a_2$. Validation of the solution is attempted at step 415. Step 430 checks whether solution validation was successful. If no, then fixing is determined to have failed at step 435. If yes, then the ambiguities are fixed with the current ambiguity solution candidate $a_1$ at step 440. Fixing ends successfully at step 445.

Figure 5:
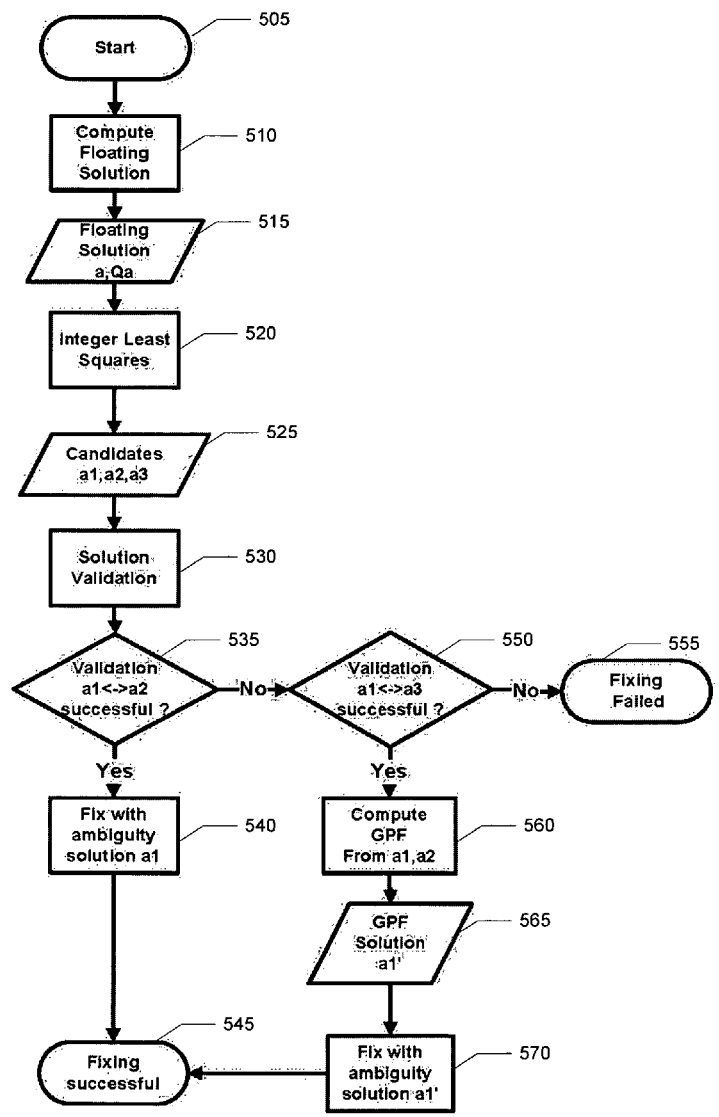
FIG. 5 is a flow chart of generalized partial fixing with candidate validation in accordance with some embodiments of the invention.

FIG. 5 is a flow chart of generalized partial fixing with candidate validation in accordance with some embodiments of the invention. The approach of FIG. 5 enhances the prior art method of FIG. 4 by generating three instead of two candidates in the Integer Least Squares solution. If validation using the first two candidate solution fails, the third candidate solution is inspected. If the validation is now successful using the first and the third candidate, the GPF matrix G is computed from the first and second candidate and applied to the solution generating the final accepted solution. If this second validation fails, the whole initialization process fails.

Referring to FIG. 5, the process flow starts at step 505. A floating solution is computed at step 510 to determine floating values 515 for parameters a and Qa. An Integer Least Squares adjustment is computed at step 520 to determine candidates 525 comprising best candidate $a_1$ and second best candidate $a_2$ and third best candidate $a_3$. Validation of the solution is attempted at step 530. Step 535 checks whether solution validation was successful by comparing best candidate $a_1$ with second best candidate $a_2$. If yes, then fixing is performed at step 540 using ambiguity candidate solution $a_1$ and fixing ends successfully at step 545. If at step 535 it is determined that solution validation was not successful when comparing best candidate $a_1$ with second best candidate $a_2$, then step 550 checks whether solution validation was successful by comparing best candidate $a_1$ with third best candidate $a_3$. If no, then fixing fails at step 555. If yes, then at step 560 the GPF solution $a_1'$ at 565 is computed using best candidate $a_1$ and second best candidate $a_2$. Fixing is then performed at step 565 using GPF solution $a_1'$ and fixing ends successfully at step 545.

Figure 6:
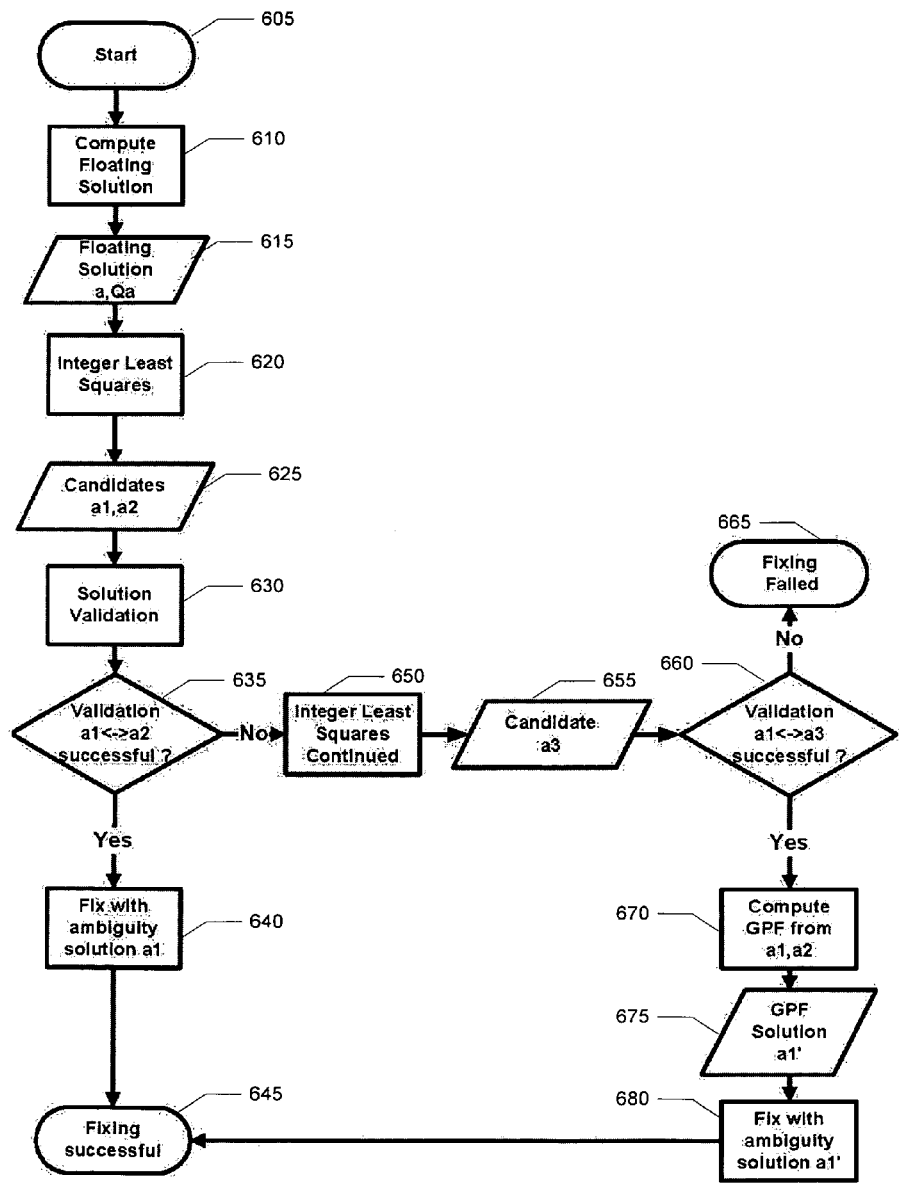
FIG. 6 is a flow chart of generalized partial fixing with a candidate validation variant in accordance with some embodiments of the invention.

FIG. 6 is a flow chart of generalized partial fixing with a candidate validation variant in accordance with some embodiments of the invention. FIG. 6 differs from the variant of FIG. 5 in that the third candidate solution is not generated before the validation had been attempted for first and second solution. The third solution is not needed unless this first validation fails. In that case, the third solution is generated and compared to the first one. If the validation is now successful using the first and the third candidate, the GPF matrix G is computed from the first and second candidate and applied to the solution generating the final accepted solution. If this second validation fails, the whole initialization process fails.

Referring to FIG. 6, the process flow starts at step 605. A floating solution is computed at step 610 to determine floating values 615 for parameters a and Qa. An Integer Least Squares adjustment is computed at step 620 to determine candidates 625 comprising best candidate $a_1$ and second best candidate $a_2$. Validation of the solution is attempted at step 630. Step 635 checks whether solution validation was successful by comparing best candidate $a_1$ with second best candidate $a_2$. If yes, then fixing is performed at step 640 using ambiguity candidate solution $a_1$ and fixing ends successfully at step 645. If at step 635 it is determined that solution validation was not successful when comparing best candidate $a_1$ with second best candidate $a_2$, then step 650 continues the integer least squares adjustment to obtain a third best candidate $a_1$ at 655. Step 660 checks whether solution validation was successful by comparing best candidate $a_1$ with third best candidate $a_3$. If no, then fixing fails at step 665. If yes, then at step 670 the GPF solution $a_1'$ at 675 is computed using best candidate $a_1$ and second best candidate $a_2$. Fixing is then performed at step 680 using GPF solution $a_1'$ and fixing ends successfully at step 645.

Figure 7:
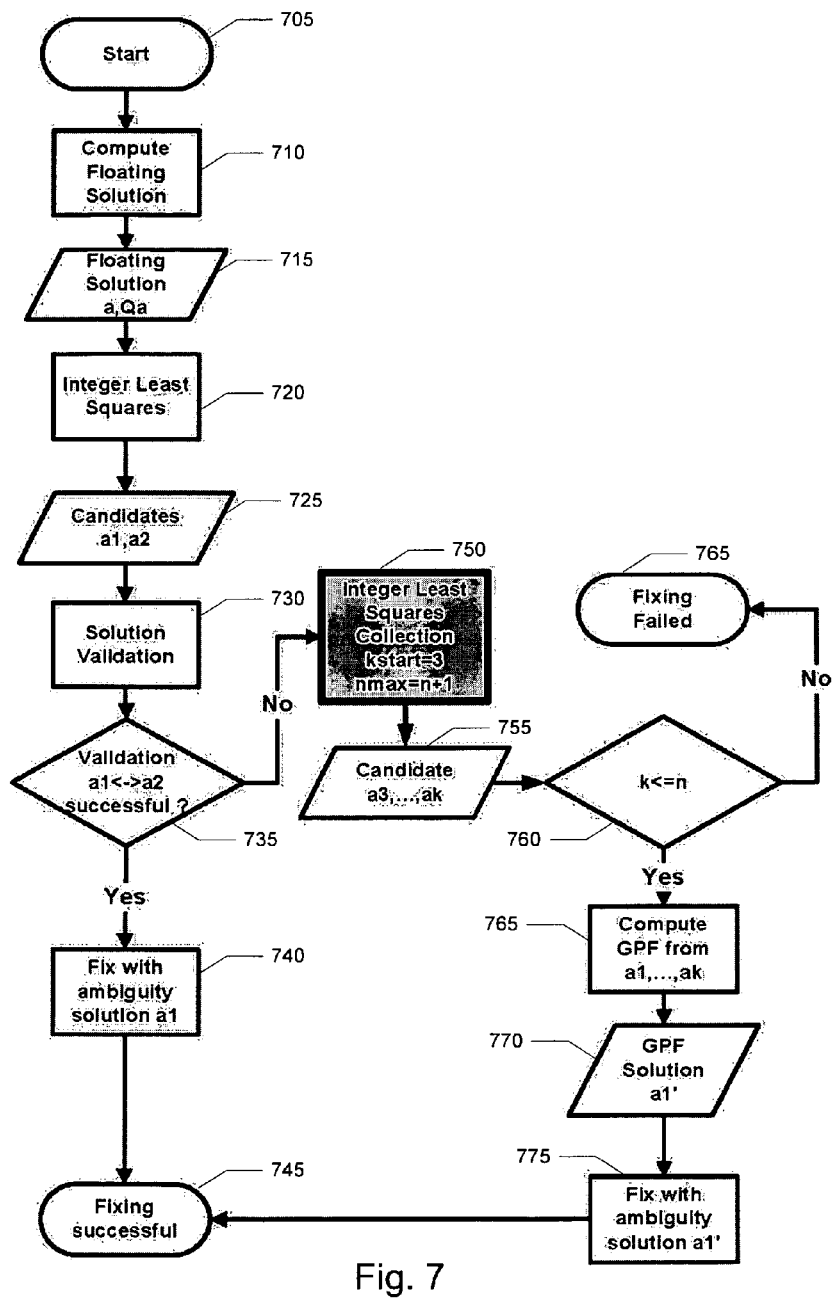
FIG. 7 is a flow chart of generalized partial fixing generating all needed candidates for validation in accordance with some embodiments of the invention.

FIG. 7 is a flow chart of generalized partial fixing generating all needed candidates for validation in accordance with some embodiments of the invention. In FIG. 7, the Integer Least Squares Collection invocation generates the complete validation collection up to a candidate k. If this succeeds for a k≤n, the GPF is performed and the initialization is successful. Integer Least Squares Collection flow charts are found in FIG. 9, FIG. 10 and FIG. 11. This mechanization uses the generation of GPF matrices for more than two candidates, see chapter 3.3 "Multiple Candidates" above.

Referring to FIG. 7, the process flow starts at step 705. A floating solution is computed at step 710 to determine floating values 715 for parameters a and Qa. An Integer Least Squares adjustment is computed at step 720 to determine candidates 725 comprising best candidate $a_1$ and second best candidate $a_2$. Validation of the solution is attempted at step 730. Step 735 checks whether solution validation was successful by comparing best candidate $a_1$ with second best candidate $a_2$. If yes, then fixing is performed at step 740 using ambiguity candidate solution $a_1$ and fixing ends successfully at step 745. If at step 735 it is determined that solution validation was not successful when comparing best candidate $a_1$ with second best candidate $a_2$, then step 750 invokes Integer Least Squares Collection to generate the complete validation collection 755 up to a $k^{th}$ candidate: candidates $a_3 \ldots a_k$. Step 760 checks whether this has succeeded for a k≤n. If no, then fixing fails at step 765. If yes, then at step 765 the GPF solution $a_1'$ at 770 is computed using candidates $a_1 \ldots a_k$. Fixing is then performed at step 775 using GPF solution $a_1'$ and fixing ends successfully at step 745.

Figure 8:
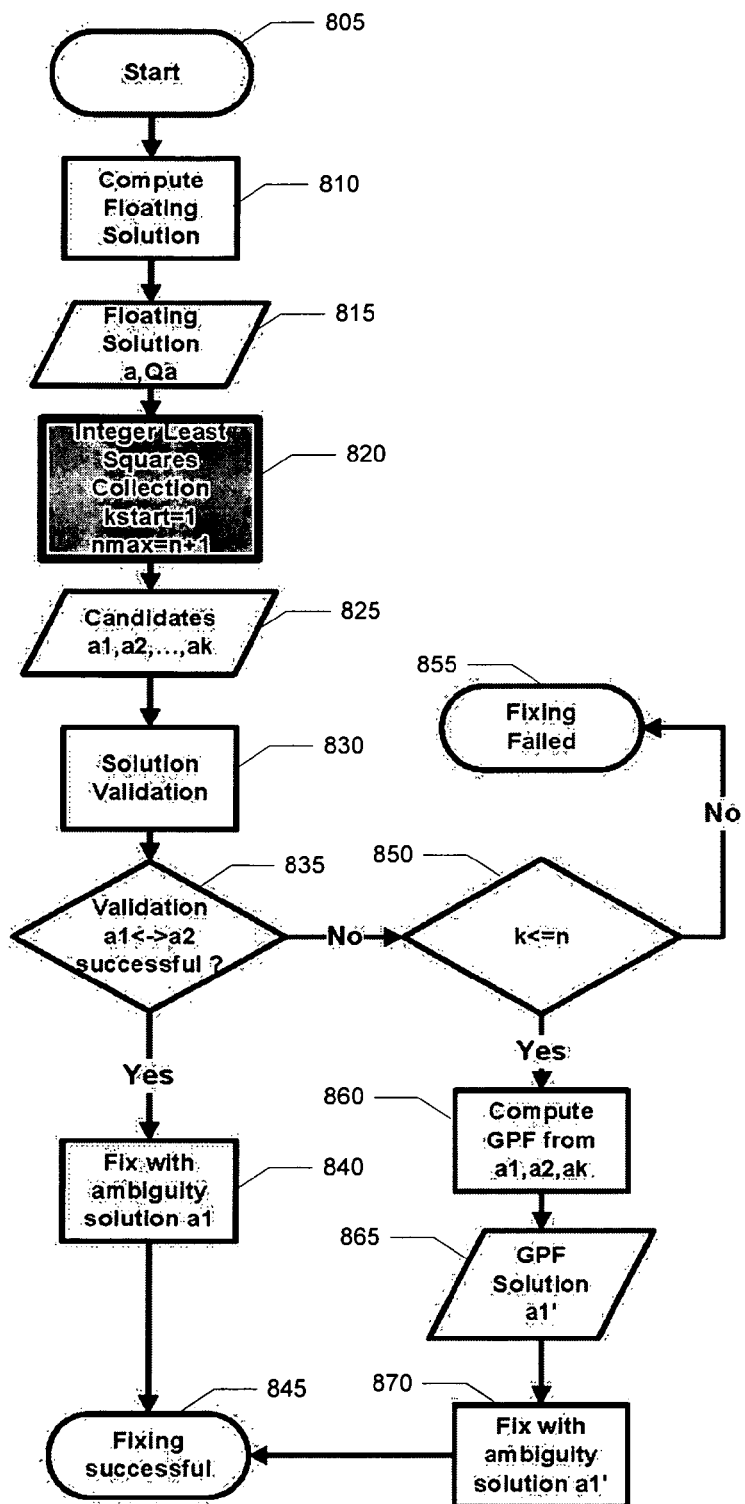
FIG. 8 is a flow chart of generalized partial fixing initially generating all needed candidates in accordance with some embodiments of the invention.

FIG. 8 is a flow chart of generalized partial fixing initially generating all needed candidates in accordance with some embodiments of the invention. In the embodiment of FIG. 8, all candidates needed to validate the best solution are generated right away in the initial Integer Least Squares Collection. Next the first two candidates are validated as usual, and if this fails, GPF is applied if k<=n. Again, the Integer Least Squares Collection flow charts are found in FIG. 9, FIG. 10 and FIG. 11. This implementation uses the generation of GPF matrices for more than two candidates, see chapter 3.3 "Multiple Candidates" above.

Referring to FIG. 8, the process flow starts at step 805. A floating solution is computed at step 810 to determine floating values 815 for parameters a and Qa. Integer Least Squares Collection is invoked at step 820 to determine candidates 825 comprising candidates $a_1, a_2 \ldots a_k$. Validation of the solution is attempted at step 830. Step 835 checks whether solution validation was successful by comparing best candidate $a_1$ with second best candidate $a_2$. If yes, then fixing is performed at step 840 using ambiguity candidate solution $a_1$ and fixing ends successfully at step 845. If at step 835 it is determined that solution validation was not successful when comparing best candidate $a_1$ with second best candidate $a_2$, then step 850 checks whether k<=n. If no, then fixing fails at step 855. If yes, then at step 860 the GPF solution $a_1'$ at 865 is computed using candidates $a_1, a_2, a_k$. Fixing is then performed at step 865 using GPF solution $a_1'$ and fixing ends successfully at step 845.

Figure 9:
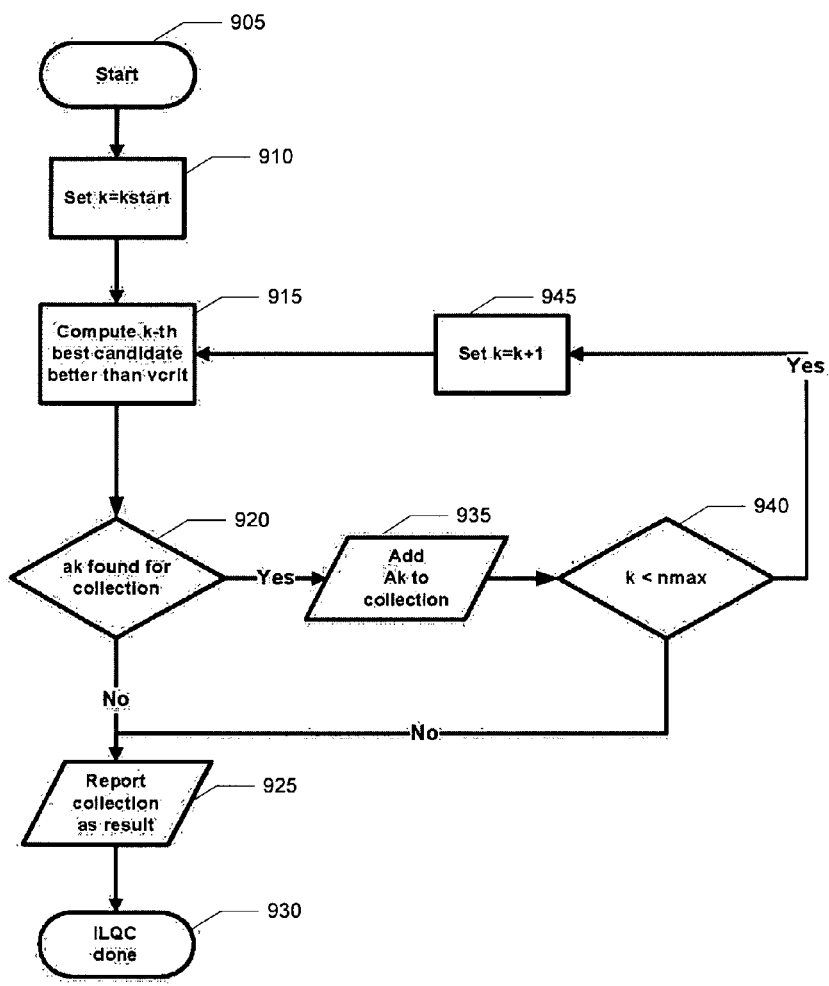
FIG. 9 is a flow chart of integer least squares collection iteration in accordance with some embodiments of the invention.

FIG. 9 is a flow chart of integer least squares collection iteration in accordance with embodiments of the invention. The procedure starts with a given candidate kstart in the ranked plurality of candidate sets possible. The iteration is continued until either no more candidate sets can be found that do not exceed the given critical value threshold or the given maximum candidate nmax had been generated.

Referring to FIG. 9, the process flow starts at step 905. A starting candidate k=kstart is set at step 910. At step 915 a $k^{th}$ best candidate better than $v_{crit}$ is computed. Step 920 checks whether a candidate $a_k$ has been found for the collection. If no, then the collection is reported at step 925 as the result of the ILS collection and the ILS collection is complete at 930. If yes, then candidate $A_k$ at 935 is added to the collection. Step 940 then checks whether k is less than nmax. If no, then the collection is reported at step 925 as the result of the ILS collection and the ILS collection is complete at 930. If yes, then k is incremented at step 945 and the flow returns to step 915.

Figure 10:
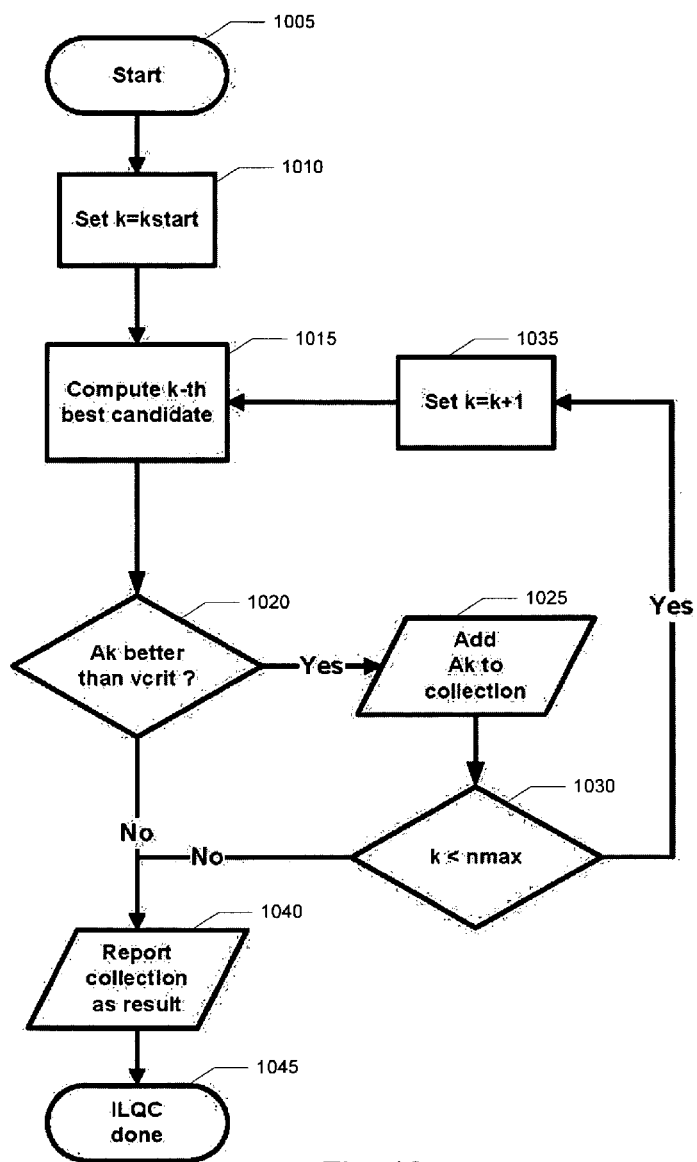
FIG. 10 is a flow chart of an integer least squares collection iteration variant in accordance with some embodiments of the invention.

FIG. 10 shows a variant of the integer least squares collection iteration of FIG. 9 in accordance with embodiments of the invention. While the first variant stops before the first candidate exceeding the critical value is generated, this time the generation continues until the first candidate exceeded the critical value has been generated. This candidate does not get included in the collection reported as a result.

Referring to FIG. 10, the process flow starts at step 1005. A starting candidate k=kstart is set at step 1010. At step 1015 a $k^{th}$ best candidate is computed. Step 1020 checks whether candidate $A_k$ is better than $v_{crit}$. If no, then the collection is reported at step 1040 as the result of the ILS collection and the ILS collection is complete at 1045. If yes, then candidate $A_k$ at 1025 is added to the collection. Step 1030 then checks whether k is less than nmax. If no, then the collection is reported at step 1040 as the result of the ILS collection and the ILS collection is complete at 1045. If yes, then k is incremented at step 1035 and the flow returns to step 1015.

Figure 11:
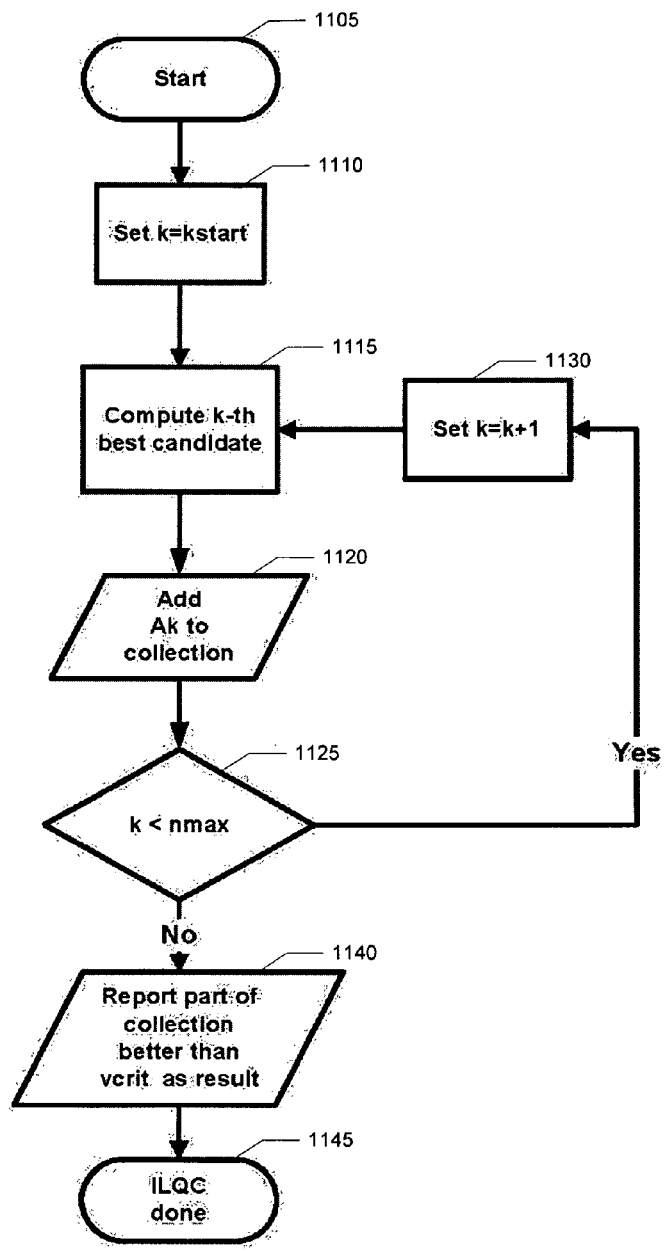
FIG. 11 is a flow chart of an integer least squares collection iteration variant in accordance with some embodiments of the invention.

FIG. 11 shows a variant of the integer least squares collection iteration of FIG. 9 in accordance with embodiments of the invention. In the embodiment of FIG. 11, always the first nmax candidates are generated. Then, only the candidates not exceeding the critical value threshold are reported as the collection.

Referring to FIG. 11, the process flow starts at step 1105. A starting candidate k=kstart is set at step 1110. At step 1115 a $k^{th}$ best candidate is computed. The resulting candidate $A_k$ is added to the collection at 1120. Step 1125 checks whether k is less than nmax. If no, then the part of the collection better than $v_{crit}$ is reported at 1140 as the result and the ILS collection is complete at 1145. If yes, then k is incremented and the flow returns to step 1115.

Figure 12:
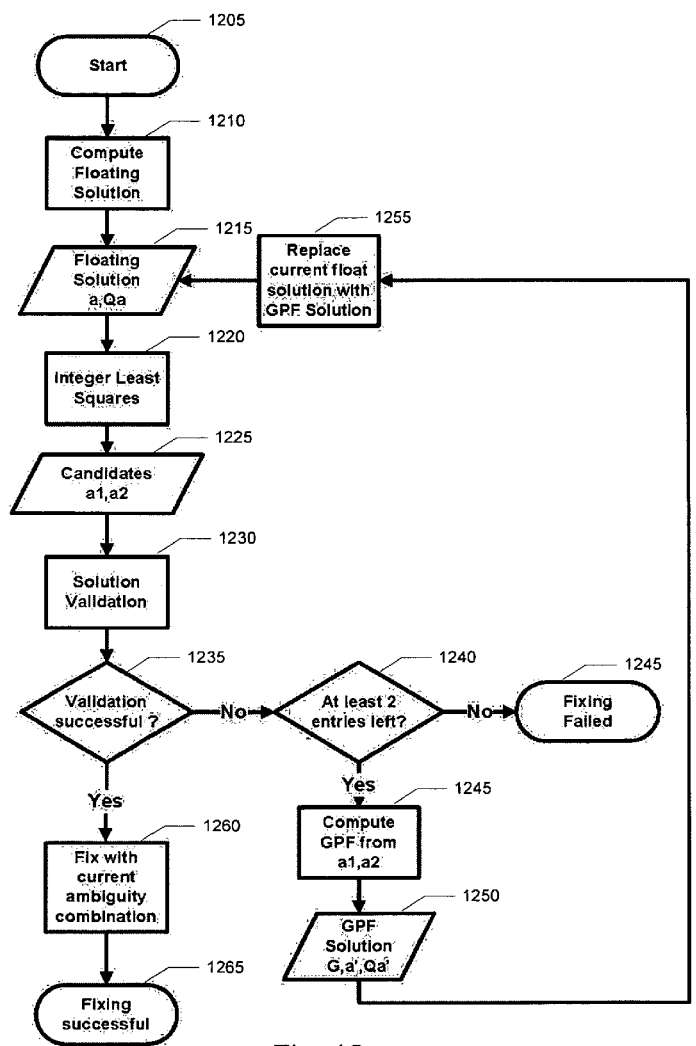
FIG. 12 is a flow chart of generalized partial fixing with search validation in accordance with some embodiments of the invention.

FIG. 12 is a flow chart of generalized partial fixing with search validation in accordance with embodiments of the invention. When the first validation fails, GPF is applied to substitute the original float solution. Then the whole search, validation and GPF process is repeated until a validation succeeds or no more than two entries remain in the modified float solution.

Referring to FIG. 12, the process flow starts at step 1205. A floating solution is computed at step 1210 to determine floating values 1215 for parameters a and Qa. Integer Least Squares adjustment is invoked at step 1220 to determine candidates 1225 comprising candidates $a_1$ and $a_2$. Validation of the solution is attempted at step 1230. Step 1235 checks whether solution validation was successful. If yes, then fixing is performed at step 1260 using the current ambiguity combination and fixing ends successfully at 1265. If at step 1235 it is determined that solution validation was not successful, then step 1240 checks whether at least two entries are left. If no, then fixing fails at 1245. If yes, then at step 1245 the GPF solution G, a', $Q_a$' at 1250 is computed from candidates $a_1$, $a_2$. Step 1255 replaces the current float solution with the GPF solution and flow returns to 1215.

Figure 13:
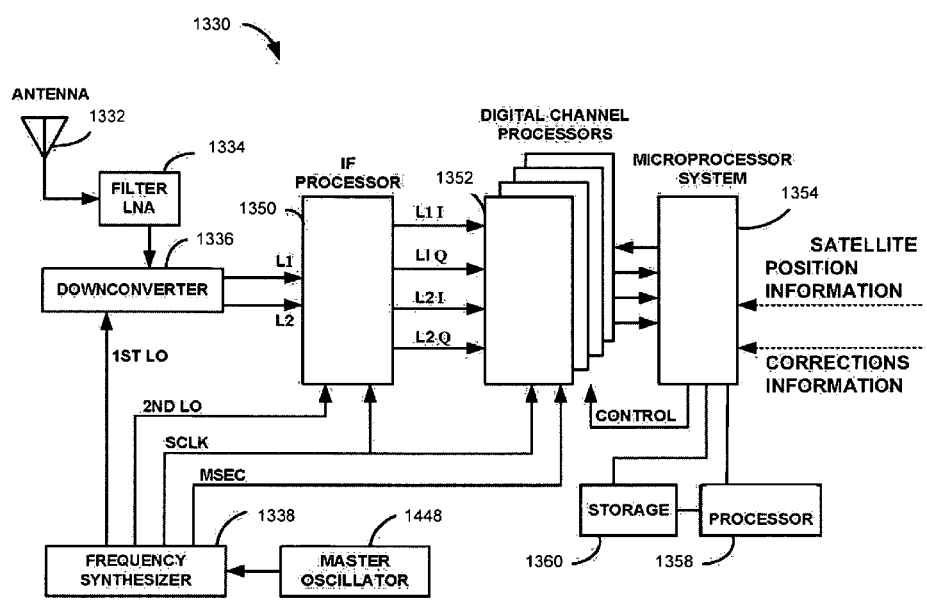
FIG. 13 shows an example GNSS receiver used in accordance with some embodiments.

FIG. 13 shows a block diagram of an example GNSS receiver which may be used in accordance with various embodiments described herein. In particular, FIG. 13 illustrates a block diagram of a GNSS receiver in the form of a general purpose GPS receiver 1330 capable of demodulation of the L1 and/or L2 signal(s) received from one or more GPS satellites. A more detailed discussion of the function of such a receiver is found in U.S. Pat. No. 5,621,426. U.S. Pat. No. 5,621,426, by Gary R. 5 Lennen, entitled "Optimized processing of signals for enhanced cross-correlation in a satellite positioning system receiver." Receivers capable of receiving and demodulating GPS L5 signals and signals of other GNSS are similarly constructed. The description here is intended as illustrative and not in any way limiting as to the construction or operation of processors or of GNSS receivers useful in practicing embodiments of the invention.

In FIG. 13, received L1 and L2 signals are generated by at least one GPS satellite. Each GPS satellite generates different signal L1 and L2 signals and they are processed by different digital channel processors 1352 which operate in the same way as one another. FIG. 13 shows GPS signals (L1=1575.42 MHz, L2=1227.60 MHz) entering GPS receiver 1330 through a dual frequency antenna 1332, commercially available from Trimble Navigation of Sunnyvale, Calif. Master oscillator 1348 provides the reference oscillator which drives all other clocks in the system. Frequency synthesizer 1338 takes the output of master oscillator 1348 and generates important clock and local oscillator frequencies used throughout the system. For example, in one embodiment frequency synthesizer 1338 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1334 performs filtering and low noise amplification of both L1 and L2 signals. The noise figure of GPS receiver 1330 is dictated by the performance of the filter/LNA combination. The downconvertor 1336 mixes both L1 and L2 signals in frequency down to approximately 175 MHz and outputs the analogue L1 and L2 signals into an IF (intermediate frequency) processor 1350. IF processor 1350 takes the analog L1 and L2 signals at approximately 175 MHz 30 and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1352 inputs the digitally sampled L1 and L2 inphase and quadrature signals. All digital channel processors 1352 are typically are identical by design and typically operate on identical input samples. Each 5 digital channel processor 1352 is designed to digitally track the L1 and L2 signals produced by one satellite by tracking code and carrier signals and to from code and carrier phase measurements in conjunction with the microprocessor system 1354. One digital channel processor 1352 is capable of tracking one satellite in both L1 and L2 channels. Microprocessor system 1354 is typically a general purpose computing device which facilitates tracking and measurements processes, providing pseudorange and carrier phase measurements for a processor 1358. In one embodiment, microprocessor system 1354 provides signals to control the operation of one or more digital channel processors 1352. Processor 1358 typically performs functions of combining measurements to produce position, velocity and time information for the differential and surveying functions. Storage 1360 is coupled with processor 1358 and microprocessor system 1354. Storage 1360 may comprise a volatile or non-volatile storage such as a RAM or ROM, or some other computer readable memory device or media. In one rover receiver embodiment, processor 1358 performs one or more of the methods of estimating integer ambiguities described herein.

In some embodiments, such as in rover receivers, microprocessor 1354 and/or processor 1358 receive additional inputs for use in refining position information determined by GPS receiver 1330. In some embodiments, corrections information is received and utilized such as satellite position information and/or corrections such as differential GPS corrections, or RTK corrections from a base station or a network of reference stations.

A GNSS receiver such as receiver 1330 can be a standalone receiver for autonomous positioning (with or without satellite position and clock information provided from an external source), a base station receiver with communications link to a rover receiver, a reference receiver of a network of receivers, a rover receiver with communications link to receive corrections from a base station, a rover receiver with communications link to receive corrections from a network processor which processes observations from multiple reference receivers, etc. Processor 1358 can be incorporated in or associated with a GNSS receiver, or can be a separate processor. Processor 1358 can be used to processes previously obtained GNSS observation data in a post-processing mode, or to process data obtained in a real-time or near real-time mode. Processor 1358 can be a network processor which estimates ambiguities from observations of a single receiver, or from observations of two or more receivers.

Any plurality of the above described aspects of the invention may be combined to form further aspects and embodiments, with the aim of providing additional benefits notably in terms of computation speed, precision estimation and system usability.

Any of the above-described methods and their embodiments may be integrated into an apparatus such as a GNSS rover receiver, a GNSS reference receiver, a GNSS base station or a GNSS network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover receiver, a reference receiver, a base station, a network station or a separate processor or even a processor incorporated in other apparatus.

In one embodiment, the receiver of the apparatus of any one of the above-described embodiments is separate from the processing element. Post-processing and network processing of the observations may be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer or server computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Any of the above-described methods and their embodiments may be implemented by means of a computer program. The computer program may be loaded on any suitable apparatus such as a processor, a rover receiver, a reference receiver or a network station as described above. Therefore, the invention also relates to a computer program, which, when carried out on a processor, a rover receiver, a reference receiver or a network station as described above, carries out any one of the above above-described methods and their embodiments.

Embodiments of the invention also include a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

Embodiments of the invention also relate to a firmware update adapted to be installed on processors or receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although embodiments of the present invention have been described on the basis of detailed examples, the detailed examples only serve to provide the skilled person with a better understanding, and are not intended to limit the scope of the invention. The scope of the invention is much rather defined by the appended claims.

Inventive concepts include but are not limited to the following:

1. A method for estimating integer ambiguities from carrier phase observations of GNSS signals received at multiple stations from at least four satellites, comprising:
   a. determining from the carrier phase observations a ranked plurality of candidate sets of estimated integer ambiguities,
   b. applying a criterion to select one of the ranked plurality of candidate sets as a selected candidate set,
   c. forming a matrix G such that the image formed when matrix G is linearly combined with a selected candidate set is equal to the image formed when matrix G is linearly combined with a second candidate set, and
   d. applying the matrix G to the selected candidate set to determine a modified candidate set of estimated integer ambiguities.

2. The method of 1, wherein determining a ranked plurality of candidate sets of estimated integer ambiguities comprises:
   i. simultaneously determining from the carrier phase observations a vector of unknown integer ambiguities and a vector of additional model parameters, without applying an integer constraint on the vector of unknown integer ambiguities, to obtain a float solution of estimates and their variance-covariance matrix, and
   ii. determining the ranked plurality of candidate sets of estimated integer ambiguities from the vector of unknown integer ambiguities and its variance-covariance matrix.

3. The method of 2, wherein the additional model parameters include at least one of: position of a station at which the GNSS signals were received, receiver clock errors, satellite clock errors, atmospheric errors, and time-correlated noise.

4. The method of 2, wherein determining the ranked plurality of candidate sets of estimated integer ambiguities from the vector of unknown integer ambiguities and its variance-covariance matrix comprises applying integer least squares to the vector of unknown integer ambiguities.
5. The method of 1, wherein applying a criterion to select one of the ranked plurality of candidate sets as a selected candidate set comprises: determining a probability of correctness of at least one candidate set.
6. The method of 5, wherein determining a probability of correctness of at least one candidate set comprises: determining a statistical value for the selected candidate set, determining a statistical value for a second candidate set, and combining the statistical values to obtain a probability of correctness indicator.
7. The method of 6, wherein the probability of correctness indicator comprises one of: a ratio of second-best to best chi-squared values exceeding a threshold, differencing of chi-squared values, Fixed Ratio Test, Fisher test for ratio validation, a Student-t-test, a standard normal distribution test for the difference of norms, and Optimal Integer Aperture Estimation.
8. The method of 6, wherein forming a matrix G and applying the matrix G are performed only if the probability of correctness does not exceed a threshold.
9. The method of 6, further comprising determining whether the probability of correctness exceeds a threshold.
10. The method of 6, further comprising:
   i. determining whether probability of correctness of the selected candidate set relative to a second candidate set exceeds a threshold and, if not,
   ii. determining whether probability of correctness of the selected candidate set relative to a third candidate set exceeds a threshold and, if yes, then
   iii. forming the matrix G and applying the matrix G to the selected candidate set.
11. The method of 6, further comprising:
   i. determining whether probability of correctness of the selected candidate set relative to a second candidate set exceeds a threshold and, if not,
   ii. generating a third candidate set and determining whether probability of correctness of the selected candidate set relative to the third candidate set exceeds a threshold and, if yes, then
   iii. forming the matrix G and applying the matrix G to the selected candidate set.
12. The method of 6, further comprising:
   i. determining whether probability of correctness of the selected candidate set relative to a second candidate set exceeds a threshold and, if not,
   ii. generating further candidate sets which do not exceed the threshold, and
   iii. forming the matrix G using all of the further candidate sets such that the image formed when matrix G is linearly combined with a one further candidate set is equal to the image formed when matrix G is linearly combined with any other further candidate set, and
   iv. applying the matrix G to the selected candidate set.
13. The method of 6, further comprising:
   i. determining whether probability of correctness of the selected candidate set relative to a second candidate set exceeds a threshold and, if not,
   ii. generating a group of further candidate sets and determining probability of correctness of the selected candidate set relative to each of the further candidate sets in turn until probability of correctness of the selected candidate set relative to one of the further candidate sets exceeds a threshold, and then
   iii. forming the matrix G and applying the matrix G to the selected candidate set.
14. The method of one of 12 or 13, wherein generating further candidate sets which do not exceed the threshold comprises: iteratively determining candidate sets which do not exceed the threshold and, with each iteration, determining whether another candidate set which does not exceed the threshold is possible.
15. The method of one of 12 or 13, wherein generating further candidate sets which do not exceed the threshold comprises: iteratively determining candidate sets and determining for each candidate set generated whether the threshold is exceeded.
16. The method one of 12 or 13, wherein generating further candidate sets which do not exceed the threshold comprises: determining a maximum number of candidate sets and subsequently determining for each candidate set generated whether the threshold is exceeded.
17. The method of 6, further comprising
   i. determining whether probability of correctness of the selected candidate set relative to a second candidate set exceeds a threshold and, if not, then
   ii. forming the matrix G and applying the matrix G to the selected candidate set to determine a modified candidate set of estimated integer ambiguities,
   iii. using the modified candidate set to determine a ranked plurality of new candidate sets, and
   iv. applying a criterion to select one of the ranked plurality of new candidate sets as a selected new candidate set.
18. The method of 17, further comprising:
   1. determining whether probability of correctness of the selected new candidate set relative to a second new candidate set exceeds a threshold and, if not, then
   2. forming a new matrix G such that the image formed when new matrix G is linearly combined with the selected new candidate set is equal to the image formed when new matrix G is linearly combined with a second new candidate set,
   3. applying the new matrix G to the selected new candidate set to determine a new modified candidate set of estimated integer ambiguities,
   4. using the new modified candidate set to determine a ranked plurality of new candidate sets, and
   5. applying a criterion to select one of the ranked plurality of new candidate sets as a selected candidate set.
19. The method of 18, wherein each new candidate set represents a possible combination of integer ambiguities and wherein the selected new candidate set is tested for validity, the method further comprising: iteratively repeating steps 1. through 5. for successive new candidate sets until either a selected new candidate set is validated or no more possible combinations remain.
20. The method of 1, wherein the matrix G represents a mapping of the vector of unknown integer ambiguities to a subset of ambiguities to be fixed.
21. The method of 1, wherein each candidate set has an ambiguities space of dimension n, and matrix G maps an input ambiguity space of dimension n to an output ambiguity space of dimension n−1.
22. The method of one of 12, 13 or 14, wherein forming matrix G comprises: forming matrix G such that the image formed when matrix G is linearly combined with a third candidate set is equal to the image formed when matrix G is linearly combined with the selected candidate set.
23. The method of 22, wherein each candidate set has an ambiguities space of dimension n, and matrix G maps an input ambiguity space of dimension n to an output ambiguity space of dimension n−2.

24. The method of one of 12, 13, or 14, wherein forming matrix G comprises: forming matrix G such that the image formed when matrix G is linearly combined with a $k^{th}$ candidate set is equal to the image formed when matrix G is linearly combined with the selected candidate set.

25. The method of 24, wherein each candidate set has an ambiguities space of dimension n, and matrix G maps an input ambiguity space of dimension n to an output ambiguity space of dimension n−(k−1).

26. The method of 1 wherein the matrix G contains non-integer entities.

27. The method of 1 wherein the matrix G contains only integer entities.

28. The method of 1, further comprising: using the selected candidate set to determine values for the additional model parameters.

29. The method of one of 17-19, further comprising: using the selected new candidate set to determine values for the additional model parameters.

30. A method of post-processing carrier phase observations of GNSS signals received over multiple epochs at multiple stations from at least four satellites to compute a position fix, comprising:
 i. Initializing a floating solution for a vector of unknown integer ambiguities and a vector of additional model parameters,
 ii. Updating the floating solution with observations received at multiple epochs,
 iii. Estimating integer ambiguities in accordance with one of 1-29 and, when successful,
 iv. Using the estimated integer ambiguities to compute the position fix.

31. The method of 30, wherein updating the floating solution comprises iteratively updating the floating solution with observations received at multiple epochs.

32. The method of 30, wherein the updating the floating solution comprises simultaneously updating the floating solution with observations received at multiple epochs.

33. A method of real-time processing of carrier phase observations of GNSS signals received over multiple epochs at multiple stations from at least four satellites to compute a position fix, comprising:
 i. Initializing a floating solution for a vector of unknown integer ambiguities and a vector of additional model parameters,
 ii. Updating the floating solution with observations received at multiple epochs,
 iii. Estimating integer ambiguities in accordance with one of 1-29 and, when successful,
 iv. Using the estimated integer ambiguities to compute values for the additional model parameters.

34. A system comprising at least one processor and memory with instructions for carrying out the method of one of 1-33.

35. A program comprising instructions adapted to cause one or more processors to carry out the method of one of 1-33.

36. A tangible, computer-readable medium, in which is embodied a program comprising instructions adapted to cause one or more processors to carry out the method of one of 1-33.

37. A computer program product comprising the computer-readable medium of 36.

The invention claimed is:

1. A method of operating a system comprising at least one processor and memory with instructions for estimating integer ambiguities from carrier phase observations of GNSS signals received at multiple stations from at least four satellites, comprising:
 a. determining from the carrier phase observations a ranked plurality of candidate sets of estimated integer ambiguities,
 b. applying a criterion to select a first candidate set of the ranked plurality of candidate sets as a selected candidate set,
 c. forming a matrix G such that the image formed when matrix G is linearly combined with the selected candidate set is equal to the image formed when matrix G is linearly combined with a second candidate set, and
 d. applying the matrix G to the selected candidate set to determine a modified candidate set of estimated integer ambiguities.

2. The method of claim 1, wherein determining a ranked plurality of candidate sets of estimated integer ambiguities comprises:
 i. simultaneously determining from the carrier phase observations a vector of unknown integer ambiguities and a vector of additional model parameters, without applying an integer constraint on the vector of unknown integer ambiguities, to obtain a float solution of estimates and their variance-covariance matrix, and
 ii. determining the ranked plurality of candidate sets of estimated integer ambiguities from the vector of unknown integer ambiguities and its variance-covariance matrix.

3. The method of claim 1, wherein applying a criterion to select the first candidate set of the ranked plurality of candidate sets as a selected candidate set comprises: determining a probability of correctness of at least one candidate set.

4. The method of claim 3, further comprising:
 i. determining whether probability of correctness of the selected candidate set relative to a probability of correctness of the second candidate set exceeds a threshold and, if not,
 ii. determining whether probability of correctness of the selected candidate set relative to a probability of correctness of a third candidate set exceeds a threshold and, if yes, then
 iii. forming the matrix G and applying the matrix G to the selected candidate set.

5. The method of claim 3, further comprising:
 i. determining whether probability of correctness of the selected candidate set relative to a probability of correctness of the second candidate set exceeds a threshold and, if not,
 ii. generating further candidate sets which do not exceed the threshold, and
 iii. forming the matrix G using all of the further candidate sets such that the image formed when matrix G is linearly combined with a one further candidate set is equal to the image formed when matrix G is linearly combined with any other further candidate set, and
 iv. applying the matrix G to the selected candidate set.

6. The method of claim 5, wherein generating further candidate sets which do not exceed the threshold comprises at least one of: (a) iteratively determining candidate sets which do not exceed the threshold and, with each iteration, determining whether another candidate set which does not exceed the threshold is possible; (b) iteratively determining candidate sets and determining for each candidate set generated whether the threshold is exceeded; and (c) determining a maximum number of candidate sets and subsequently determining for each candidate set generated whether the threshold is exceeded.

7. The method of claim 3, further comprising
   i. determining whether probability of correctness of the selected candidate set relative to the second candidate set exceeds a threshold and, if not, then
   ii. forming the matrix G and applying the matrix G to the selected candidate set to determine a modified candidate set of estimated integer ambiguities,
   iii. using the modified candidate set to determine a ranked plurality of new candidate sets, and
   iv. applying a criterion to select one of the ranked plurality of new candidate sets as a selected new candidate set.

8. The method of claim 1, wherein each candidate set has an ambiguities space of dimension n, and matrix G maps an input ambiguity space of dimension n to an output ambiguity space of dimension n−1.

9. The method of claim 1, further comprising:
   i. initializing a floating solution for a vector of unknown integer ambiguities and a vector of additional model parameters,
   ii. updating the floating solution with observations received at multiple epochs, and
   iii. using the estimated integer ambiguities to compute a position fix.

10. The method of claim 1, further comprising:
    i. initializing a floating solution for a vector of unknown integer ambiguities and a vector of additional model parameters,
    ii. updating the floating solution with observations received at multiple epochs, and
    iii. using the estimated integer ambiguities to compute values for the additional model parameters.

11. A non-transitory computer-readable medium, in which is embodied a program comprising instructions adapted to cause one or more processors to carry out the method of estimating integer ambiguities from carrier phase observations of GNSS signals received at multiple stations from at least four satellites, comprising:
    a. determining from the carrier phase observations a ranked plurality of candidate sets of estimated integer ambiguities,
    b. applying a criterion to select a first candidate set of the ranked plurality of candidate sets as a selected candidate set,
    c. forming a matrix G such that the image formed when matrix G is linearly combined with the selected candidate set is equal to the image formed when matrix G is linearly combined with a second candidate set, and
    d. applying the matrix G to the selected candidate set to determine a modified candidate set of estimated integer ambiguities.

12. Apparatus for estimating integer ambiguities from carrier phase observations of GNSS signals received at multiple stations from at least four satellites, comprising a processor and a set of instructions enabling the processor to:
    a. determine from the carrier phase observations a ranked plurality of candidate sets of estimated integer ambiguities,
    b. apply a criterion to select a first candidate set of the ranked plurality of candidate sets as a selected candidate set,
    c. form a matrix G such that the image formed when matrix G is linearly combined with the selected candidate set is equal to the image formed when matrix G is linearly combined with a second candidate set, and
    d. apply the matrix G to the selected candidate set to determine a modified candidate set of estimated integer ambiguities.

13. The apparatus of claim 12, wherein the instructions enabling the processor to determine a ranked plurality of candidate sets of estimated integer ambiguities comprise instructions to:
    i. simultaneously determining from the carrier phase observations a vector of unknown integer ambiguities and a vector of additional model parameters, without applying an integer constraint on the vector of unknown integer ambiguities, to obtain a float solution of estimates and their variance-covariance matrix, and
    ii. determining the ranked plurality of candidate sets of estimated integer ambiguities from the vector of unknown integer ambiguities and its variance-covariance matrix.

14. The apparatus of claim 12, wherein applying a criterion to select the first candidate set of the ranked plurality of candidate sets as a selected candidate set comprises: determining a probability of correctness of at least one candidate set.

15. The apparatus of claim 14, further comprising instructions enabling the processor to:
    i. determine whether probability of correctness of the selected candidate set relative to the second candidate set exceeds a threshold and, if not,
    ii. determine whether probability of correctness of the selected candidate set relative to a third candidate set exceeds a threshold and, if yes, then
    iii. form the matrix G and applying the matrix G to the selected candidate set.

16. The apparatus of claim 14, further comprising instructions enabling the processor to:
    i. determine whether probability of correctness of the selected candidate set relative to the second candidate set exceeds a threshold and, if not,
    ii. generate further candidate sets which do not exceed the threshold, and
    iii. form the matrix G using all of the further candidate sets such that the image formed when matrix G is linearly combined with a one further candidate set is equal to the image formed when matrix G is linearly combined with any other further candidate set, and
    iv. apply the matrix G to the selected candidate set.

17. The apparatus of claim 16, wherein the instructions enabling the processor to generate further candidate sets which do not exceed the threshold comprises instructions to perform at least one of the following: (a) iteratively determine candidate sets which do not exceed the threshold and, with each iteration, determine whether another candidate set which does not exceed the threshold is possible; (b) iteratively determine candidate sets and determine for each candidate set generated whether the threshold is exceeded; and (c) determine a maximum number of candidate sets and subsequently determine for each candidate set generated whether the threshold is exceeded.

18. The apparatus of claim 14, further comprising instructions enabling the processor to:
    i. determine whether probability of correctness of the selected candidate set relative to the second candidate set exceeds a threshold and, if not, then
    ii. form the matrix G and applying the matrix G to the selected candidate set to determine a modified candidate set of estimated integer ambiguities,
    iii. use the modified candidate set to determine a ranked plurality of new candidate sets, and iv. apply a criterion to select one of the ranked plurality of new candidate sets as a selected new candidate set.

19. The apparatus of claim 12, wherein each candidate set has an ambiguities space of dimension n, and matrix G maps an input ambiguity space of dimension n to an output ambiguity space of dimension n−1.

20. The apparatus of claim 12, further comprising instructions enabling the processor to:
   i. initialize a floating solution for a vector of unknown integer ambiguities and a vector of additional model parameters,
   ii. update the floating solution with observations received at multiple epochs, and
   iii. use the estimated integer ambiguities to compute a position fix.

21. The apparatus of claim 12, further comprising instructions enabling the processor to:
   i. initialize a floating solution for a vector of unknown integer ambiguities and a vector of additional model parameters,
   ii. update the floating solution with observations received at multiple epochs, and
   iii. use the estimated integer ambiguities to compute values for the additional model parameters.

* * * * *